United States Patent
Sugio et al.

(10) Patent No.: US 9,832,480 B2
(45) Date of Patent: *Nov. 28, 2017

(54) MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

(71) Applicant: SUN PATENT TRUST, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/856,965

(22) Filed: Sep. 17, 2015

(65) Prior Publication Data

US 2016/0007039 A1    Jan. 7, 2016

Related U.S. Application Data

(63) Continuation of application No. 13/409,810, filed on Mar. 1, 2012, now Pat. No. 9,210,440.

(Continued)

(51) Int. Cl.
*H04B 1/66*    (2006.01)
*H04N 7/12*    (2006.01)
(Continued)

(52) U.S. Cl.
CPC ......... *H04N 19/513* (2014.11); *H04N 19/176* (2014.11); *H04N 19/44* (2014.11);
(Continued)

(58) Field of Classification Search
CPC ...... H04N 19/573; H04N 19/52; H04N 19/51; H04N 19/513
See application file for complete search history.

(56) References Cited

U.S. PATENT DOCUMENTS 6,611,559 B1    8/2003    Shingo et al.
6,690,724 B1    2/2004    Kadono
(Continued)

FOREIGN PATENT DOCUMENTS

EP    1 411 729        4/2004
EP    1 503 599 A2    2/2005
(Continued)

OTHER PUBLICATIONS

ITU-T H.264 Mar. 2010 "Advanced video coding for generic audiovisual services".
(Continued)

*Primary Examiner* — Joseph Ustaris
*Assistant Examiner* — Rebecca Volentine
(74) *Attorney, Agent, or Firm* — Wenderoth, Lind & Ponack, L.L.P.

(57) ABSTRACT

A moving picture coding method includes: coding, using a motion vector, a current block to be coded; generating a plurality of predictive motion vectors; and coding the motion vector using one of the predictive motion vectors, and when a co-located block included in a coded picture and co-located with the current block has two reference motion vectors and reference directions of the two reference motion vectors are the same, a first prediction vector is generated using a first reference motion vector and a second prediction vector is generated using a second reference motion vector in the generating of a plurality of predictive motion vectors.

2 Claims, 37 Drawing Sheets

Related U.S. Application Data

(60) Provisional application No. 61/448,683, filed on Mar. 3, 2011.

(51) Int. Cl.
*H04N 11/02* (2006.01)
*H04N 11/04* (2006.01)
*H04N 19/513* (2014.01)
*H04N 19/52* (2014.01)
*H04N 19/51* (2014.01)
*H04N 19/573* (2014.01)
*H04N 19/176* (2014.01)
*H04N 19/44* (2014.01)

(52) U.S. Cl.
CPC .............. *H04N 19/51* (2014.11); *H04N 19/52* (2014.11); *H04N 19/573* (2014.11)

(56) References Cited

U.S. PATENT DOCUMENTS

| | | |
|---|---|---|
| 7,233,621 B2 | 6/2007 | Jeon |
| 7,733,960 B2 | 6/2010 | Kondo et al. |
| 7,782,936 B2 | 8/2010 | Kondo et al. |
| 7,970,058 B2 | 6/2011 | Suzuki |
| 8,462,852 B2 | 6/2013 | Xu et al. |
| 8,537,897 B2 | 9/2013 | Lee et al. |
| 9,008,181 B2 | 4/2015 | Chen et al. |
| 2002/0181579 A1 | 12/2002 | Vetro et al. |
| 2003/0215014 A1 | 11/2003 | Koto et al. |
| 2004/0008784 A1 | 1/2004 | Kikuchi et al. |
| 2004/0017851 A1 | 1/2004 | Haskell et al. |
| 2004/0052507 A1 | 3/2004 | Kondo et al. |
| 2004/0057518 A1 | 3/2004 | Knee et al. |
| 2004/0066848 A1 | 4/2004 | Jeon |
| 2004/0086044 A1* | 5/2004 | Kondo .................. H04N 19/105 375/240.13 |
| 2004/0136461 A1 | 7/2004 | Kondo et al. |
| 2004/0146109 A1 | 7/2004 | Kondo et al. |
| 2004/0146110 A1 | 7/2004 | Bjontegaard |
| 2004/0190615 A1 | 9/2004 | Abe et al. |
| 2004/0218674 A1 | 11/2004 | Kondo et al. |
| 2004/0234143 A1* | 11/2004 | Hagai .................. H04N 19/105 382/238 |
| 2004/0268266 A1 | 12/2004 | Slotznick et al. |
| 2005/0013497 A1 | 1/2005 | Hsu et al. |
| 2005/0053147 A1 | 3/2005 | Mukerjee et al. |
| 2005/0129125 A1 | 6/2005 | Cha et al. |
| 2005/0141612 A1 | 6/2005 | Abe et al. |
| 2005/0152452 A1 | 7/2005 | Suzuki |
| 2005/0185713 A1 | 8/2005 | Winger et al. |
| 2006/0153300 A1 | 7/2006 | Wang et al. |
| 2006/0198445 A1 | 9/2006 | Li et al. |
| 2007/0025444 A1 | 2/2007 | Okada et al. |
| 2007/0036218 A1 | 2/2007 | Burazerovic |
| 2007/0071107 A1 | 3/2007 | Ha |
| 2007/0076795 A1 | 4/2007 | Lee |
| 2007/0104379 A1 | 5/2007 | Kim et al. |
| 2007/0183499 A1 | 8/2007 | Kimata et al. |
| 2007/0211802 A1 | 9/2007 | Kikuchi et al. |
| 2008/0063060 A1 | 3/2008 | Kondo et al. |
| 2008/0063061 A1 | 3/2008 | Kondo et al. |
| 2008/0063071 A1 | 3/2008 | Suzuki |
| 2008/0063072 A1 | 3/2008 | Suzuki |
| 2008/0063075 A1 | 3/2008 | Kondo et al. |
| 2008/0069225 A1 | 3/2008 | Suzuki |
| 2008/0069231 A1 | 3/2008 | Kondo et al. |
| 2008/0069232 A1 | 3/2008 | Kondo et al. |
| 2008/0075171 A1 | 3/2008 | Suzuki |
| 2008/0117979 A1 | 5/2008 | Kondo et al. |
| 2008/0240247 A1 | 10/2008 | Lee et al. |
| 2008/0267292 A1 | 10/2008 | Ito et al. |
| 2009/0041124 A1 | 2/2009 | Ohgose |
| 2009/0059068 A1 | 3/2009 | Hanaoka et al. |
| 2009/0074069 A1* | 3/2009 | Jeon .................. H04N 19/521 375/240.15 |
| 2009/0110075 A1 | 4/2009 | Chen et al. |
| 2009/0116759 A1 | 5/2009 | Suzuki et al. |
| 2009/0190660 A1 | 7/2009 | Kusakabe et al. |
| 2009/0207914 A1 | 8/2009 | Choi et al. |
| 2009/0290642 A1 | 11/2009 | Ohgose |
| 2010/0079605 A1 | 4/2010 | Wang et al. |
| 2010/0195723 A1 | 8/2010 | Ikai et al. |
| 2010/0202539 A1 | 8/2010 | Kondo et al. |
| 2010/0223239 A1 | 9/2010 | Madsen et al. |
| 2010/0316127 A1 | 12/2010 | Yokoyama |
| 2011/0002389 A1 | 1/2011 | Xu et al. |
| 2011/0002392 A1 | 1/2011 | Park et al. |
| 2011/0038420 A1 | 2/2011 | Lee et al. |
| 2011/0080954 A1 | 4/2011 | Bossen et al. |
| 2011/0085593 A1 | 4/2011 | Wang et al. |
| 2011/0090964 A1 | 4/2011 | Xu et al. |
| 2011/0150095 A1 | 6/2011 | Choi et al. |
| 2011/0176612 A1 | 7/2011 | Tsai et al. |
| 2011/0182362 A1 | 7/2011 | Kim et al. |
| 2012/0008688 A1 | 1/2012 | Tsai et al. |
| 2012/0106634 A1 | 5/2012 | Jeon et al. |
| 2012/0147966 A1 | 6/2012 | Lee et al. |
| 2012/0155542 A1 | 6/2012 | Lee et al. |
| 2012/0189055 A1 | 7/2012 | Chien et al. |
| 2012/0189058 A1 | 7/2012 | Chen et al. |
| 2012/0195368 A1 | 8/2012 | Chien et al. |
| 2012/0207219 A1 | 8/2012 | Someya |
| 2012/0269268 A1 | 10/2012 | Kim et al. |
| 2012/0281764 A1 | 11/2012 | Lee et al. |
| 2013/0279594 A1 | 10/2013 | Lee et al. |
| 2013/0336401 A1 | 12/2013 | Jeon |
| 2013/0336402 A1 | 12/2013 | Xu et al. |

FOREIGN PATENT DOCUMENTS

| | | |
|---|---|---|
| JP | 2003-333600 | 11/2003 |
| JP | 2004-23458 | 1/2004 |
| JP | 2004-129191 | 4/2004 |
| JP | 2004-208258 | 7/2004 |
| JP | 2004-208259 | 7/2004 |
| JP | 2009-201112 | 9/2009 |
| JP | 5020829 | 9/2012 |
| WO | 2004/008775 | 1/2004 |
| WO | 2007/074543 | 7/2007 |

OTHER PUBLICATIONS

Toshiyasu Sugio and Takahiro Nishi, Modified usage of predicted motion vectors in forward directional bi-predictive coding frame, Joint Collaborative Team on Video Coding (JCT-VC) of ITU-T SG16 WP3 and ISO/IEC JTC1/SC29/WG11, JCTVC-D274, 4$^{th}$ Meeting: Daegu, KR, Jan. 2011, pp. 1-7.

Jian-Liang Lin et al., Improved Advanced Motion Vector Prediction, Joint Collaborative Team on Video Coding (JCT-VC) of ITU-T SG16 WP3 and ISO/IEC JTC1/SC29/WG11, JCTVA-D125_r2, 4$^{th}$ Meeting: Daegu, KR, Jan. 2011, pp. 1-8.

Test Model under Consideration, Output Document (draft007), Joint Collaborative Team on Video Coding (JCT/VC) of ITU-T SG16 WP3 and ISO/IEC JTC1/SC29/WG11, JCTVC-B205, 2$^{nd}$ Meeting: Geneva, CH, Oct. 2010, pp. 1-6, 80-93.

Byeong-Moon Jeon, Direct mode in B pictures, Joint Video Team (JVT) of ISO/IEC MPEG & ITU-T VCEG (ISO/IEC JTC1/SC29/WG11 and ITU-T SG16 Q.6), JVT-D056, 4$^{th}$ Meeting: Klagenfurt, Austria, Jul. 2002, pp. 1-7.

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3$^{rd}$ Meeting: Guangzhou, CN, Oct. 7-15, 2010.

Test Model under Consideration, Output Document (draft007) "Joint Collaborative Team on Video Coding (JCT-VC) of ITU-T SG16 WP3 and ISO/IEC JTC1/SC29/WG11", 2nd Meeting: Geneva, CH, Oct. 2010, JCTVC-B205, pp. 1-14, 26-27, 35-39, 53, 61-64, 78-93.

(56) References Cited

OTHER PUBLICATIONS

Toshiyasu Sugio and Takahiro Nishi, "Modified derivation process of temporal motion vector predictor", Joint Collaborative Team on Video Coding (JCT-VC) of ITU-T SG16 WP3 and ISO/IEC JTC1/SC29/WG11, 4th Meeting: Daegu, KR, Jan. 2011, pp. 1-4.

Jiali Zheng et al., "Extended Direct Mode for Hierarchical B Picture Coding", IEEE International Conference on Image Processing, 2005, ICIP 2005., IEEE, Sep. 11, 2005, vol. 2, p. II-265-268.

Toshiyasu Sugio and Takahiro Nishi, CE9: Experiment A, I, J and S Modified derivation process of reference index for skip mode and temporal motion vector predictor, Joint Collaborative Team on Video Coding (JCT-VC) of ITU-T SG16 WP3 and ISO/IEC JTC1/SC29/WG11, 5th Meeting: Geneva, CH, Mar. 2011, JCTVC-E230, pp. 1-6.

ITU-T H.264, Telecommunication Standardization Sector of ITU, Series H: Audiovisual and Multimedia Systems Infrastructure of audiovisual services—Coding of moving video, Advanced video coding for generic audiovisual services, Mar. 2010.

"Test Model under Consideration", Output Document (draft007), Joint Collaborative Team on Video Coding (JCT-VC) of ITU-T SG16 WP3 and ISO/IEC JTC1/SC29/WG11 $2^{nd}$ Meeting: Geneva, CH, Document: JCTVC-B205, ITU-T, Oct. 2010.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6) $4^{th}$ Meeting: Klagenfurt, Austria, Contribution: JVT-D056, ITU-T, Jul. 2002.

J. Jung et al., "TE11: Report on experiment 3.3.b: 'temporally oriented' set of predictors for MV-Competition", Joint Collaborative Team on Video Coding (JCT-VC) of ITU-T SG16 WP3 and ISO/IEC JTC1/SC29/WG11 $3^{rd}$ Meeting: Guangzhou, CN, Document: JCTVC-C291, ITU-T, Oct. 2010.

Jiali Zheng et al., "Extended Direct Mode for Hierarchical B Picture Coding", IEEE International Conference on Image Porcessing, 2005, ICIP 2005, vol. 2, IEEE, Sep. 11, 2005, pp. II-265-268.

Joel Jung and Guillaume Laroche, "Competition-Based Scheme for Motion Vector Selection and Coding", ITU-Telecommunications Standardization Sector Study Group 16 Question 6 Video Coding Experts Group (VCEG) $29^{th}$ Meeting: Klagenfurt, Austria, Document VCEG-AC06, ITU-T, Jul. 2006.

"Test Model under Consideration", Output Document (draft007), Joint Collaborative Team on Video Coding (JCT-VC) of ITU-T SG16 WP3 and ISO/IEC JTC1/SC29/WG11, $2^{nd}$ Meeting: Geneva, CH, Oct. 2010, JCTVC-B205, pp. 1-14, 26, 27, 35-39, 53, 61-64 and 80-93.

Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, $4^{th}$ Meeting: Daegu, KR, Jan. 2011.

Jian-Liang Lin et al., "Improved Advanced Motion Vector Prediction", Joint Collaborative Team on Video Coding (JCT-VC) of ITU-T SG16 WP3 and ISO/IEC JTC1/SC29/WG11, JCTVC-D125_r2, $4^{th}$ Meeting: Daegu, KR, Jan. 2011, pp. 1-8.

Toshiyasu Sugio et al., "Modified derivation process of temporal motion vector predictor", Joint Collaborative Team on Video Coding (JCT-VC) of ITU-T SG16 WP3 and ISO/IEC JTC1/SC29/WG11, $4^{th}$ Meeting: Daegu, KR, Jan. 2011, JCTVC-D273, pp. 1-4.

"Test Model under Consideration" Output Document (draft007), Joint Collaborative Team on Video Coding (JCT-VC) of ITU-T SG16 WP3 and ISO/IEC JTC1/SC29/WG11, $2^{nd}$ Meeting: Geneva, CH, Document: JCTVC-B205, Oct. 2010, pp. 78-93.

International Search Report dated Mar. 6, 2012 in corresponding International Application No. PCT/JP2011/006641.

"Test Model under Consideration", Output Document (draft005), Joint Collaborative Team on Video Coding (JCT-VC) of ITU-T SG16 WP3 and ISO/IEC JTC1/SC29/WG11, JCTVC-B205, $2^{nd}$ Meeting: Geneva, CH, Sep. 2010, pp. 1-6, and 82-96.

International Search Report dated Apr. 24, 2012 in corresponding International Application No. PCT/JP2012/000131.

"Test Model under Consideration", Output Document (draft007), Joint Collaborative Team on Video Coding (JCT-VC) of ITU-T SG16 WP3 and ISO/IEC JTC1/SC29/WG11, $2^{nd}$ Meeting: Geneva, CH, Document: JCTVC-B205, ITU-T, Oct. 2010, pp. 78-93.

Draft of Version 4 of ISO/IEC 14496-10, Joint Video Team (JVT) of ISO/IEC MPEG & ITU-T VECG (ISO/IEC JTC1/SC29/WG11 and ITU T SG16 Q.6), $14^{th}$ Meeting: Hong Kong, CH, Jan. 18-21, 2005, Document: JVT-N050d1, Filename: JVT-N050d1.doc, Date: Jan. 28, 2005, pp. 105-106.

International Search Report dated May 29, 2012 in corresponding International Application No. PCT/JP2012/001389.

"Test Model under Consideration", Output Document (draft007), Joint Collaborative Team on Video Coding (JCT-VC) of ITU-T SG16 WP3 and ISO/IEC JTC1/SC29/WG11, JCTVC-B205, $2^{nd}$ Meeting: Geneva, CH, Oct. 2010, pp. 1-6 and 80-93.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6) JVT-D056, $4^{th}$ Meeting: Klagenfurt, Austria, Jul. 2002, pp. 1-7.

Toshiyasu Sugio et al., "CE9: Experiment A, I, J and S Modified derivation process of reference index for skip mode and temporal motion vector predictor", Joint Collaborative Team on Video Coding (JCT-VC) of ITU-T SG16 WP3 and ISO/IEC JTC1/SC29/WG11, $5^{th}$ Meeting: Geneva, CH, Mar. 2011, JCTVC-E230, pp. 1-6.

Triceps corporation, "Jisedai Dougazou Fugouka Houshiki (Next Generation Video Coding Method)", MPEG-4 AVC | H.264, Mar. 12, 2004, pp. 64-66 (Chapter 6.2 to 7) (with partial translation).

International Search Report dated Feb. 7, 2012 in corresponding International Application No. PCT/JP2011/006517.

Guillaume Laroche et al., "RD Optimized Coding for Motion Vector Predictor Selection" IEEE Transactions on Circuits and Systems for Video Technology, IEEE Service Center, Piscataway, NJ, US, vol. 18, No. 9, Sep. 1, 2008, pp. 1247-1257, XP011231739.

Iain E. Richardson, "The H.264 Advanced Video Compression Standard", 2nd Edition, chapter 5, H.264 syntax, Apr. 20, 2010, XP030001636.

Joel Jung et al., "Competition-Based Scheme for Motion Vector Selection and Coding", ITU—Telecommunications Standardization Sector, Study Group 16 Question 6, Video Coding Experts Group (VCEG) $29^{th}$ Meeting: Klagenfurt, AT, Jul. 17-18, 2006, XP030003490.

Extended European Search Report dated May 20, 2014 for the European Patent Application No. 12734216.0.

Frank Bossen, Philipp Kosse, "Simplified motion vector coding method", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, [JCTVC-B094].

"Test Model under Consideration", Joint Collaborative Team on Video Coding (JCT-VC) of ITU-T SG16 WP3 and ISO/IEC JTC1/SC29/WG11, 1st Meeting: Dresden, DE, Jul. 18, 2010, [JCTVC-A205], pp. 39, 74-75.

Extended European Search Report dated Mar. 16, 2016 for the European Patent Application No. 11843582.5.

Final Office Action dated Jun. 24, 2016 issued for U.S. Appl. No. 13/985,315.

Office Action dated Nov. 3, 2016 issued for U.S. Appl. No. 14/957,886.

Office Action dated Apr. 21, 2017 issued for U.S. Appl. No. 13/985,315.

Office Action dated May 18, 2017 issued for U.S. Appl. No. 14/707,407.

\* cited by examiner

| Predictive motion vector index | Candidate predictive motion vector in prediction direction 0 |
|---|---|
| 0 | Median(MVL0_A, MVL0_B, MVL0_C) |
| 1 | MVL0_A |
| 2 | MVL0_B |
| 3 | MVL0_C |
| 4 | Temporal direct vector TMVL0 |

| Predictive motion vector index | Candidate predictive motion vector in prediction direction 1 |
|---|---|
| 0 | Median(MVL1_A, MVL1_B, 0) |
| 1 | MVL1_A |
| 2 | MVL1_B |
| 3 | Temporal direct vector TMVL1 |

FIG. 3B

| Predictive motion vector index | Candidate predictive motion vector in prediction direction X |
|---|---|
| 0 | Temporal direct vector TMVLX |
| 1 | Median(MVLX_A, MVLX_B, MVLX_C) |
| 2 | MVLX_A |
| 3 | MVLX_B |
| 4 | MVLX_C |

FIG. 3C

| Predictive motion vector index | Candidate predictive motion vector in prediction direction X |
|---|---|
| 0 | Median(MVLX_A, MVLX_B, MVLX_C) |
| 1 | MVLX_A |
| 2 | MVLX_B |
| 3 | MVLX_C |
| 4 | Temporal direct vector TMVLX |

FIG. 3D

| Predictive motion vector index | Candidate predictive motion vector in prediction direction X |
|---|---|
| 0 | Temporal direct vector TMVLX |
| 1 | Median(MVLX_A, MVLX_B, MVLX_C) |
| 2 | MVLX_A |
| 3 | MVLX_B |
| 4 | MVLX_C |

FIG. 3E

| Predictive motion vector index | Candidate predictive motion vector in prediction direction X |
|---|---|
| 0 | Median(MVLX_A, MVLX_B, MVLX_C) |
| 1 | MVLX_A |
| 2 | MVLX_B |
| 3 | MVLX_C |
| 4 | Temporal direct vector TMVLX |

FIG. 4

| Predictive motion vector index | Assigned bit string |
|---|---|
| 0 | 0 |
| 1 | 10 |
| 2 | 110 |
| 3 | 1110 |
| 4 | 1111 |

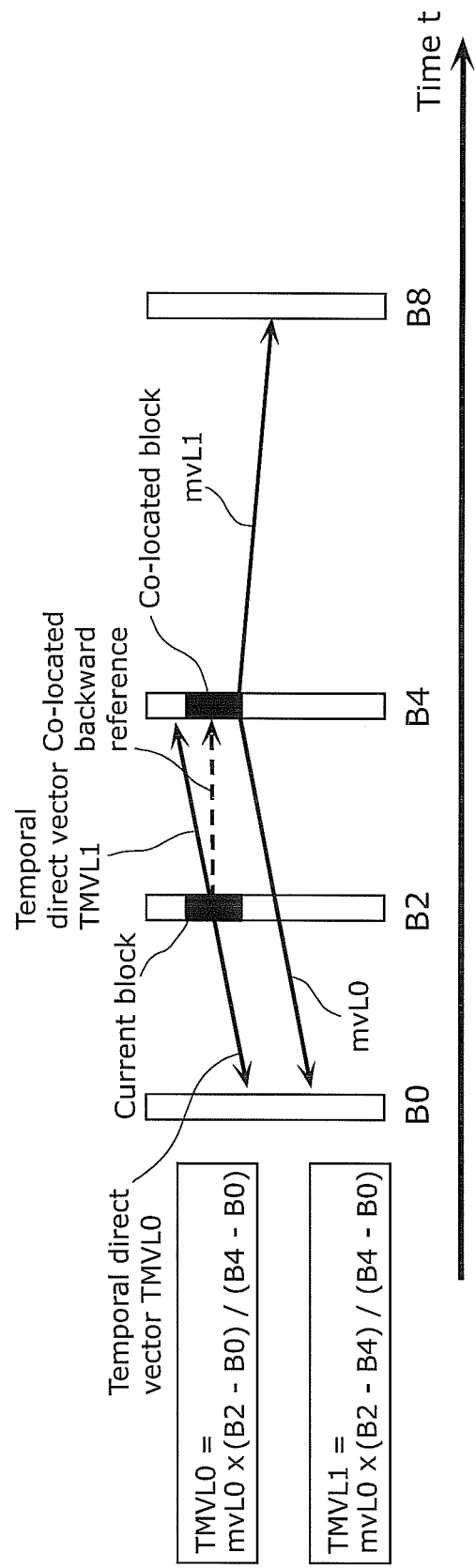

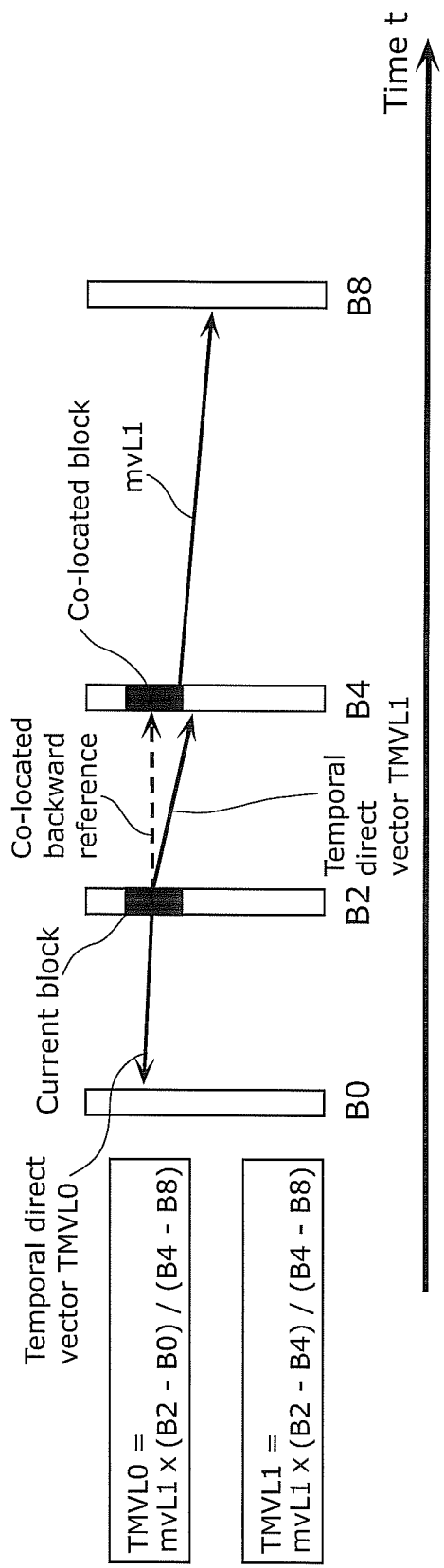

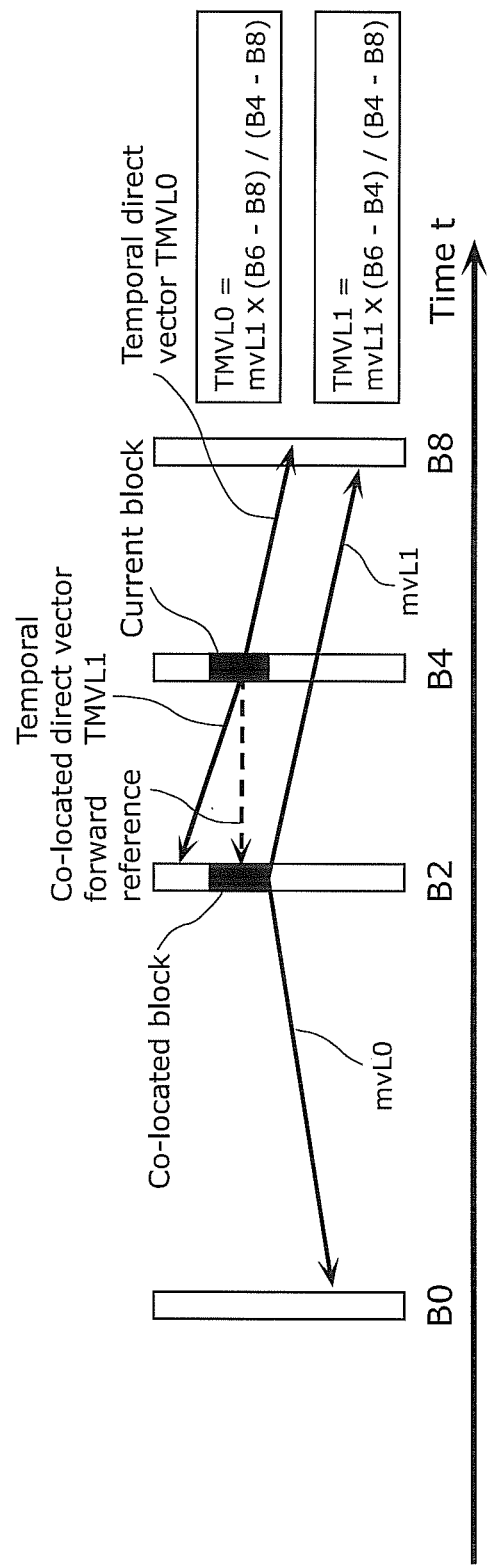

FIG. 21

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

Data structure of PMT

FIG. 32

| Corresponding standard | Driving frequency |
|---|---|
| MPEG-4 AVC | 500 MHz |
| MPEG-2 | 350 MHz |
| ⋮ | ⋮ | ex900 ex1000

MOVING PICTURE CODING METHOD, MOVING PICTURE DECODING METHOD, MOVING PICTURE CODING APPARATUS, MOVING PICTURE DECODING APPARATUS, AND MOVING PICTURE CODING AND DECODING APPARATUS

CROSS REFERENCE TO RELATED APPLICATIONS

This is a continuation of application Ser. No. 13/409,810, filed Mar. 1, 2012, which claims the benefit of U.S. Provisional Patent Application No. 61/448,683 filed Mar. 3, 2011. The entire disclosures of the above-identified applications, including the specifications, drawings and claims are incorporated herein by reference in their entirety.

TECHNICAL FIELD

The present invention relates to moving picture coding methods and moving picture decoding methods.

BACKGROUND ART

In moving picture coding processes, the quantity of information is generally reduced using redundancy of the moving pictures in spatial and temporal directions. Here, a method using the redundancy in the spatial direction is generally represented by the transformation into the frequency domain. A method using the redundancy in the temporal direction is represented by an inter-picture prediction (hereinafter referred to as inter prediction) coding process.

In the inter prediction coding process, when coding a certain picture, a coded picture located, in display time order, before or after the current picture to be coded is used as a reference picture. Subsequently, a motion vector is derived through motion estimation of the current picture with respect to the reference picture, and a difference is calculated between image data of the current picture and prediction picture data resulting from motion compensation based on the motion vector, to remove the redundancy in the temporal direction. Here, in the motion estimation, values of difference between blocks within the reference picture and a current block to be coded which is included in the current picture are calculated, and one of the blocks within the reference picture which has the smallest value of difference is defined as a reference block. Using the current block and the reference block, a motion vector is then estimated.

In the moving picture coding scheme called H. 264, which has already been standardized, three types of pictures: I-picture, P-picture, and B-picture, are used to reduce the quantity of information. The I-picture is a picture on which no inter prediction coding process is performed, that is, on which only an intra-picture prediction (hereinafter referred to as intra prediction) coding process is performed. The P-picture is a picture on which the inter prediction coding process is performed with reference to only one coded picture located before or after the current picture in display time order. The B-picture is a picture on which the inter prediction coding process is performed with reference to two coded pictures located before or after the current picture in display time order.

In the inter prediction coding, a reference picture list for specifying the reference picture is generated. The reference picture list is a list in which a reference picture index is assigned to each coded reference picture which is referred to in the inter prediction. For example, a B-picture holds two reference picture lists because it can be coded with reference to two pictures. By the reference picture index, a reference picture is then specified from the reference picture lists.

FIG. 13 shows an example of the reference picture lists in a B-picture. A reference picture list 0 (hereinafter referred to as a reference list L0) in FIG. 13 is an example of the reference picture list in a prediction direction 0 in bi-directional prediction. In the example of FIG. 13, a reference picture 1 in display order 2 is assigned to a value 0 of a reference picture index 0, a reference picture 2 in display order 1 is assigned to a value 1 of the reference picture index 0, and a reference picture 3 in display order 0 is assigned to a value 2 of the reference picture index 0. In other words, the reference picture indices are assigned in order from temporally closest to the current picture in display order.

Meanwhile, a reference picture list 1 (hereinafter referred to as a reference list L1) is an example of the reference picture list in a prediction direction 1 in bi-directional prediction. In the example of FIG. 13, a reference picture 2 in display order 1 is assigned to a value 0 of a reference picture index 1, a reference picture 1 in display order 2 is assigned to a value 1 of the reference picture index 1, and a reference picture 3 in display order 0 is assigned to a value 2 of the reference picture index 1.

As above, it is possible that the reference picture indices assigned to each reference picture are different in each prediction direction (reference pictures 1 and 2 in FIG. 13) and that the reference picture indices assigned to each reference picture are the same in the respective prediction directions (a reference picture 3 in FIG. 13). In coding a B-picture, the inter prediction will be performed using a motion vector (mvL0) which refers to the reference picture specified by the reference picture index 0 in the reference list L0 and a motion vector (mvL1) which refers to the reference picture specified by the reference picture index 1 in the reference list L1. In coding a P-picture, only one reference list will be used.

Furthermore, in the moving picture coding scheme called H. 264, a coding mode called temporal direct mode can be selected at the time of deriving a motion vector in coding of a B-picture. The inter prediction coding method in temporal direct is described with reference to FIG. 14. FIG. 14 illustrates motion vectors in temporal direct and shows the case where a block "a" in a picture B2 is coded in temporal direct.

This case uses a motion vector "a" of a block "b" that is co-located with the block "a" and included in a picture P3 which is a reference picture located after the picture B2. The motion vector "a" is a motion vector used in coding of the block "b" and refers to a picture P1. Using a motion vector parallel to the motion vector "a", a reference block is then obtained from each of the picture P1 which is a forward reference picture and the picture P3 which is a backward reference picture, and the block "a" is coded based on bi-directional prediction. Specifically, the motion vectors used in coding of the block "a" are a motion vector "b" with respect to the picture P1 and a motion vector "c" with respect to the picture P3.

CITATION LIST

Non Patent Literature

ITU-T H. 264 March 2010

SUMMARY OF INVENTION

Technical Problem

However, in the case of the conventional temporal direct, the motion vector to be used in temporal direct is limited to a motion vector which is of a reference picture located, in display time order, after a current picture to be coded and is directed forward in display time order.

Such limitation of the motion vector to be used in temporal direct causes problems of making it difficult to derive the motion vector most suitable for the current block, which leads to a decreased compression rate.

The present invention has an object to solve the above problems and aims to derive the motion vector most suitable for the current picture and improve the compression rate by adaptively selecting a motion vector to be used in temporal direct.

Solution to Problem

A moving picture coding method according to an aspect of the present invention is a method of coding, based on inter prediction, a current block to be coded which is included in a current picture to be coded. Specifically, the moving picture coding method comprises: coding the current block using a motion vector; generating a plurality of predictive motion vectors; and coding the motion vector using one of the predictive motion vectors generated in the generating. Furthermore, when a co-located block included in a coded picture and co-located with the current block has two reference motion vectors and reference directions of the two reference motion vectors are the same, in the generating, a first prediction vector of the current block is generated using a first reference motion vector out of the two reference motion vectors, the first prediction vector and the first reference motion vector each corresponding to a first reference picture list, and a second prediction vector of the current block is generated using a second reference motion vector out of the two reference motion vectors, the second prediction vector and the second reference motion vector each corresponding to a second reference picture list.

In the above method, a motion vector to be used in temporal direct is adaptively selected, which makes it possible to derive the motion vector most suitable for the current picture and to improve the compression rate.

As an example, in the generating, when the coded picture is located before the current picture in display order and both of the two reference motion vectors are forward reference motion vectors, the first prediction vector may be generated using the first reference motion vector, and the second prediction vector may be generated using the second reference motion vector.

As another example, in the generating, when the coded picture is located after the current picture in display order and both of the two reference motion vectors are backward reference motion vectors, the first prediction vector may be generated using the first reference motion vector, and the second prediction vector may be generated using the second reference motion vector.

Furthermore, in the generating, when the reference directions of the two reference motion vectors are different, the first prediction vector and the second prediction vector may be generated using a reference motion vector directed toward the current picture out of the two reference motion vectors.

As an example, in the generating, when the coded picture is located before the current picture in display order, the first prediction vector and the second prediction vector may be generated using a backward reference motion vector out of the two reference motion vectors.

As another example, in the generating, when the coded picture is located after the current picture in display order, the first prediction vector and the second prediction vector may be generated using a forward reference motion vector out of the two reference motion vectors.

A moving picture decoding method according to an aspect of the present invention is a method of decoding, based on inter prediction, a current block to be decoded which is included in a current picture to be decoded. Specifically, the moving picture decoding method comprises: generating a plurality of predictive motion vectors; decoding a motion vector using one of the predictive motion vectors generated in the generating; and decoding the current block using the motion vector decoded in the decoding of a motion vector. Furthermore, when a co-located block included in a decoded picture and co-located with the current block has two reference motion vectors and reference directions of the two reference motion vectors are the same, in the generating, a first prediction vector of the current block is generated using a first reference motion vector out of the two reference motion vectors, the first prediction vector and the first reference motion vector each corresponding to a first reference picture list, and a second prediction vector of the current block is generated using a second reference motion vector out of the two reference motion vectors, the second prediction vector and the second reference motion vector each corresponding to a second reference picture list.

A moving picture coding apparatus according to an aspect of the present invention is an apparatus which codes, based on inter prediction, a current block to be coded which is included in a current picture to be coded. Specifically, the moving picture coding apparatus comprises: an image coding unit configured to code the current block using a motion vector; a candidate predictive motion vector generation unit configured to generate a plurality of predictive motion vectors; and a motion vector coding unit configured to code the motion vector using one of the predictive motion vectors generated by the candidate predictive motion vector generation unit. Furthermore, when a co-located block included in a coded picture and co-located with the current block has two reference motion vectors and reference directions of the two reference motion vectors are the same, the candidate predictive motion vector generation unit is configured to: generate a first prediction vector of the current block using a first reference motion vector out of the two reference motion vectors, the first prediction vector and the first reference motion vector each corresponding to a first reference picture list; and generate a second prediction vector of the current block using a second reference motion vector out of the two reference motion vectors, the second prediction vector and the second reference motion vector each corresponding to a second reference picture list.

A moving picture decoding apparatus according to an aspect of the present invention is an apparatus which decodes, based on inter prediction, a current block to be decoded which is included in a current picture to be decoded. Specifically, the moving picture decoding apparatus comprises: a candidate predictive motion vector generation unit configured to generate a plurality of predictive motion vectors; a motion vector decoding unit configured to decode a motion vector using one of the predictive motion vectors generated by the candidate predictive motion vector generation unit; and an image decoding unit configured to decode the current block using the motion vector decoded by the motion vector decoding unit. Furthermore, when a co-located block included in a decoded picture and co-located with the current block has two reference motion vectors and reference directions of the two reference motion vectors are the same, the candidate predictive motion vector generation unit is configured to: generate a first prediction vector of the current block using a first reference motion vector out of the two reference motion vectors, the first prediction vector and the first reference motion vector each corresponding to a first reference picture list; and generate a second prediction vector of the current block using a second reference motion vector out of the two reference motion vectors, the second prediction vector and the second reference motion vector each corresponding to a second reference picture list.

A moving picture coding and decoding apparatus according to an aspect of the present invention is a moving picture coding and decoding apparatus which comprises: a moving picture coding unit configured to code, based on inter prediction, a current block to be coded which is included in a current picture to be coded; and a moving picture decoding unit configured to decode, based on inter prediction, a current block to be decoded which has been generated by the moving picture coding unit. The moving picture coding unit includes: an image coding unit configured to code, using a motion vector, the current block to be coded; a first candidate predictive motion vector generation unit configured to generate a plurality of predictive motion vectors; and a motion vector coding unit configured to code the motion vector using one of the predictive motion vectors generated by the first candidate predictive motion vector generation unit. Furthermore, when a co-located block included in a coded picture and co-located with the current block to be coded has two reference motion vectors and reference directions of the two reference motion vectors are the same, the first candidate predictive motion vector generation unit is configured to: generate a first prediction vector of the current block to be coded, using a first reference motion vector out of the two reference motion vectors, the first prediction vector and the first reference motion vector each corresponding to a first reference picture list; and generate a second prediction vector of the current block to be coded, using a second reference motion vector out of the two reference motion vectors, the second prediction vector and the second reference motion vector each corresponding to a second reference picture list. The moving picture decoding apparatus comprises: a second candidate predictive motion vector generation unit configured to generate a plurality of predictive motion vectors; a motion vector decoding unit configured to decode a motion vector using one of the predictive motion vectors generated by the second candidate predictive motion vector generation unit; and an image decoding unit configured to decode the current block to be decoded, using the motion vector decoded by the motion vector decoding unit. Furthermore, when a co-located block included in a decoded picture and co-located with the current block to be decoded has two reference motion vectors and reference directions of the two reference motion vectors are the same, the second candidate predictive motion vector generation unit is configured to: generate a first prediction vector of the current block to be decoded, using a first reference motion vector out of the two reference motion vectors, the first prediction vector and the first reference motion vector each corresponding to a first reference picture list; and generate a second prediction vector of the current block to be decoded, using a second reference motion vector out of the two reference motion vectors, the second prediction vector and the second reference motion vector each corresponding to a second reference picture list.

Advantageous Effects of Invention

According to the present invention, a motion vector to be used in temporal direct is adaptively selected, which makes it possible to derive the motion vector most suitable for the current picture and to improve the compression rate.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 3B shows an example of priority rankings of the candidate predictive motion vectors;

FIG. 3C shows another example of the priority rankings of the candidate predictive motion vectors;

FIG. 3D shows another example of the priority rankings of the candidate predictive motion vectors;

FIG. 3E shows another example of the priority rankings of the candidate predictive motion vectors;

FIG. 4 shows an example of a code table which is used in the case of performing variable-length coding on predictive motion vector indices;

FIG. 8A shows an example of a method of calculating a temporal direct vector, which is applied in the case where the co-located block is a backward reference block and has both a forward reference motion vector and a backward reference motion vector;

FIG. 8B shows an example of calculating a temporal direct vector, which is applied in the case where the co-located block is a backward reference block and has a backward reference motion vector only;

FIG. 9A shows an example of a method of calculating a temporal direct vector, which is applied in the case where the co-located block is a forward reference block and has both a forward reference motion vector and a backward reference motion vector;

FIG. 21 illustrates a structure of the multiplexed data;

FIG. 32 shows an example of a look-up table in which standards of video data are associated with the driving frequencies.

DESCRIPTION OF EMBODIMENTS

Embodiments of the present invention are described below with reference to the drawings.

Embodiment 1

Figure 1A:
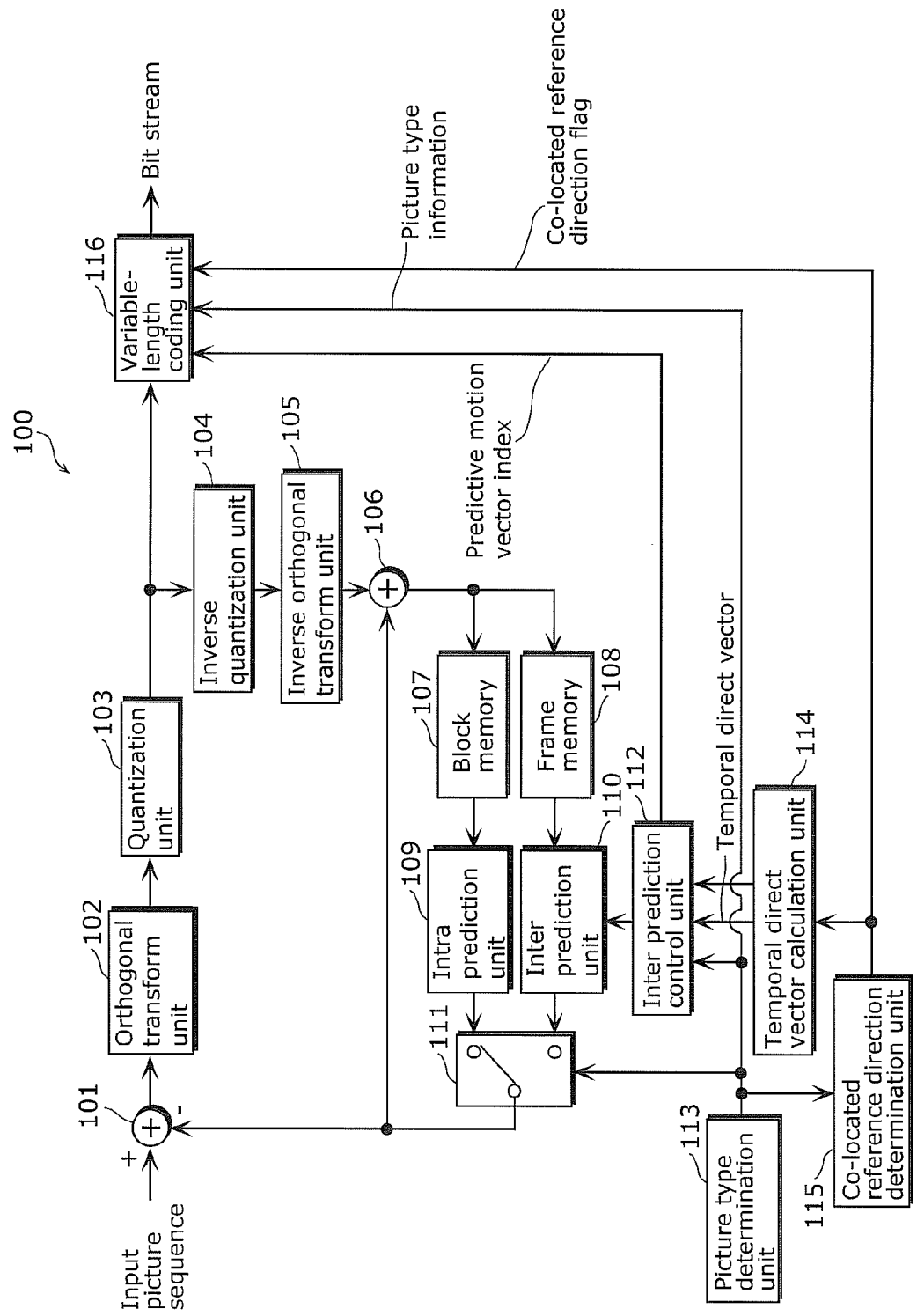
FIG. 1A is a block diagram showing a moving picture coding apparatus according to Embodiment 1.

FIG. 1A is a block diagram showing a moving picture coding apparatus according to Embodiment 1 of the present invention.

A moving picture coding apparatus 100 includes, as shown in FIG. 1A, a subtracting unit 101, an orthogonal transform unit 102, a quantization unit 103, an inverse quantization unit 104, an inverse orthogonal transform unit 105, an adding unit 106, a block memory 107, a frame memory 108, an intra prediction unit 109, an inter prediction unit 110, a switch 111, an inter prediction control unit 112, a picture type determination unit 113, a temporal direct vector calculation unit 114, a co-located reference direction determination unit 115, and a variable-length coding unit 116.

The subtracting unit 101 obtains, from outside the apparatus, an input picture sequence including a current block to be coded and obtains a prediction block from the switch 11, and then outputs, to the orthogonal transform unit 102, a residual block generated by subtracting the prediction block from the current block.

The orthogonal transform unit 102 transforms, from the image domain to the frequency domain, the residual block obtained from the subtracting unit 101, and outputs a transform coefficient to the quantization unit 103. The quantization unit 103 quantizes the transform coefficient obtained from the orthogonal transform unit 102 and outputs the quantized coefficient to the inverse quantization unit 104 and the variable-length coding unit 116.

The inverse quantization unit 104 inversely quantizes the quantized coefficient obtained from the quantization unit 103 and outputs the reconstructed transform coefficient to the inverse orthogonal transform unit 105. The inverse orthogonal transform unit 105 transforms, from the frequency domain to the image domain, the reconstructed transform coefficient obtained from the inverse quantization unit 104 and outputs the reconstructed residual block to the adding unit 106.

The adding unit 106 adds the reconstructed residual block obtained from the inverse orthogonal transform unit 105 and the prediction block obtained from the switch 111 and outputs the reconstructed current block (input picture sequence) to the block memory 107 and the frame memory 108. The block memory 107 stores the reconstructed input picture sequence per block. The frame memory 108 stores the reconstructed input picture sequence per frame.

The picture type determination unit 113 determines which one of the picture types: I-picture, B-picture, and P-picture, is used to code the input picture sequence, and generates picture type information. The picture type determination unit 113 then outputs the generated picture type information to the switch 111, the inter prediction control unit 112, the co-located reference direction determination unit 115, and the variable-length coding unit 116.

The intra prediction unit 109 generates the prediction block by performing intra prediction for the current block with use of the reconstructed block-by-block input picture sequence stored in the block memory 107, and outputs the generated prediction block to the switch 111. The inter prediction unit 110 generates the prediction block by performing inter prediction for the current block with use of the reconstructed frame-by-frame input picture sequence stored in the frame memory 108 and a motion vector derived through motion estimation, and outputs the generated prediction block to the switch 111.

The switch 111 outputs, to the subtracting unit 110 and the adding unit 106, the prediction block generated by the intra prediction unit 109 or the prediction block generated by the inter prediction unit 110. For example, the switch 111 may be designed to output one of the two prediction blocks which is lower in coding cost The co-located reference direction determination unit 115 determines which one of a block included in a picture located, in display time order, before a current picture to be coded (hereinafter referred to as a forward reference block) and a block included in a picture located after the current picture in display time order (hereinafter referred to as a backward reference block) will be a co-located block. The co-located reference direction determination unit 115 then generates a co-located reference direction flag for each picture and outputs the generated co-located reference direction flag to the temporal direct vector calculation unit 114 and the variable-length coding unit 116.

Figure 1B:
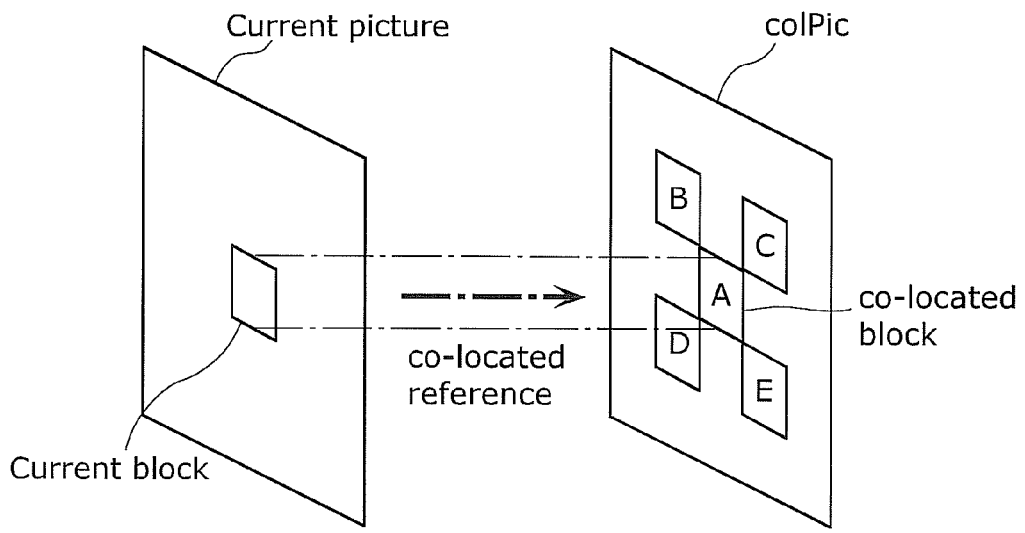
FIG. 1B shows the position of a co-located block.

Here, the co-located block indicates a block which is included in a coded picture different from the current picture including the current block and whose position in the coded picture is the same as the current block (block A of FIG. 1B). It is to be noted that although the co-located block is a block whose position in the coded picture is the same as the current block in this embodiment, the co-located block is not always limited to such block. For example, peripheral blocks of the block A co-located with the current block, such as blocks B, C, D, and E in FIG. 1B, may each be used as the co-located block. With this, in the case where the block A is coded based on intra prediction and therefore has no motion vector, for example, one of the peripheral blocks B, C, D, and E can be used as the co-located block. As a result, the accuracy of a temporal direct vector can be improved, which allows improvement in the coding efficiency.

The temporal direct vector calculation unit 114 derives, by way of temporal direct using a reference motion vector of the co-located block, a temporal direct vector which is a candidate predictive motion vector. The temporal direct vector calculation unit 114 then outputs the derived temporal direct vector to the inter prediction control unit 112.

Specifically, when the co-located block has two reference motion vectors in the same reference direction, the temporal direct vector calculation unit 114 derives, by way of temporal direct using the two motion vectors of the co-located block, candidate predictive motion vectors (a temporal direct vector TMVL0 in a prediction direction 0 and a temporal direct vector TMVL1 in a prediction direction 1). Furthermore, the temporal direct vector calculation unit 114 assigns each of the temporal direct vectors in the respective prediction directions with a value of a corresponding predictive motion vector index. It is to be noted that "two reference motion vectors in the same reference direction" indicates the case where the co-located block has two forward reference motion vectors (motion vectors calculated with reference to pictures located before the coded picture in display order) or two backward reference motion vectors (motion vectors calculated with reference to pictures located after the coded picture in display order).

When the co-located block does not have two forward or backward reference motion vectors (typically when the co-located block has two reference motion vectors in different reference directions), the temporal direct vector calculation unit 114 determines, based on whether the co-located block is a forward reference block or a backward reference block, a motion vector of the co-located block which is to be used in temporal direct. Specifically, the temporal direct vector calculation unit 114 calculates a candidate predictive motion vector using one of the two reference motion vectors of the co-located block which is directed toward the current picture.

When the co-located block is a backward reference block, the temporal direct vector calculation unit 114 derives a candidate predictive motion vector (the temporal direct vector TMVL0 in the prediction direction 0 and the temporal direct vector TMVL1 in the prediction direction 1) by way of temporal direct using a forward reference motion vector of the co-located block.

It is to be noted that when the co-located block has no forward reference motion vector (that is, when the co-located block has a backward reference motion vector only), the temporal direct vector calculation unit 114 derives a candidate predictive motion vector (the temporal direct vector TMVL0 in the prediction direction 0 and the temporal direct vector TMVL1 in the prediction direction 1) by way of temporal direct using the backward reference motion vector of the co-located block.

When the co-located block is a forward reference block, the temporal direct vector calculation unit 114 derives a candidate predictive motion vector (the temporal direct vector TMVL0 in the prediction direction 0 and the temporal direct vector TMVL1 in the prediction direction 1) by way of temporal direct using a backward reference motion vector of the co-located block.

It is to be noted that when the co-located block has no backward reference motion vector (that is, when the co-located block has a forward reference motion vector only), the temporal direct vector calculation unit 114 derives a candidate predictive motion vector (the temporal direct vector TMVL0 in the prediction direction 0 and the temporal direct vector TMVL1 in the prediction direction 1) by way of temporal direct using the forward reference motion vector of the co-located block.

The inter prediction control unit 112 determines that the motion vector is coded using one of a plurality of candidate predictive motion vectors which has the smallest error relative to the motion vector derived through motion estimation. Here, the error indicates a value of difference between the candidate predictive motion vector and the motion vector derived through motion estimation, for example. Furthermore, the inter prediction control unit 112 generates, per block, a predictive motion vector index which corresponds to the determined predictive motion vector. The inter prediction control unit 112 then sends the predictive motion vector index and error information on the candidate predictive motion vector to the variable-length coding unit 116.

The variable-length coding unit 116 generates a bit stream by performing variable-length coding on: the quantized coefficient obtained from the quantization unit 103; the predictive motion vector index and the error information on the candidate predictive motion vector, obtained from the inter prediction control unit 112; the picture type information obtained from the picture type determination unit 113; and the co-located reference direction flag obtained from the co-located reference direction determination unit 115.

Figure 2:
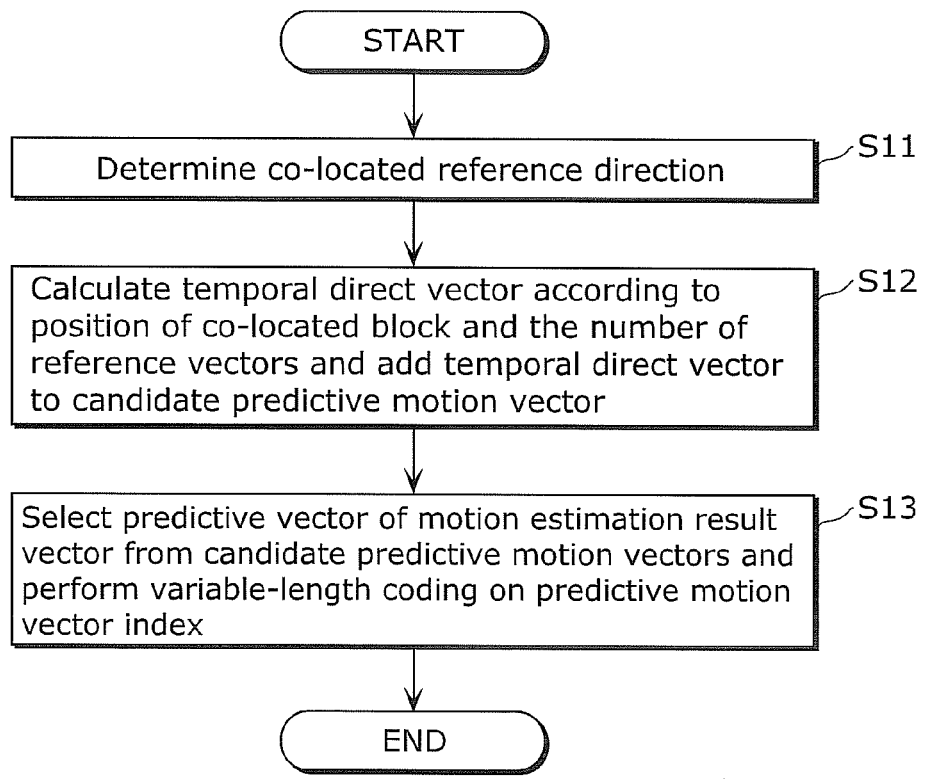
FIG. 2 shows an outline of a processing flow of a moving picture coding method according to Embodiment 1.

FIG. 2 shows an outline of a processing flow of a moving picture coding method according to Embodiment 1 of the present invention.

When a candidate predictive motion vector is derived in temporal direct, the co-located reference direction determination unit 115 determines which one of the forward reference block and the backward reference block will be the co-located block (S11). Furthermore, the co-located reference direction determination unit 115 generates, per picture, a co-located block reference flag that indicates whether the co-located block is a forward reference block or a backward reference block, and outputs the generated co-located block reference flag to the temporal direct vector calculation unit 114 and the variable-length coding unit 116.

Next, the temporal direct vector calculation unit 114 derives a candidate predictive motion vector by way of temporal direct using a reference motion vector of the co-located block. When the co-located block has two forward or backward reference motion vectors, the temporal direct vector calculation unit 114 derives, by way of temporal direct using the two motion vectors of the co-located block, candidate predictive motion vectors (the temporal direct vector TMVL0 in the prediction direction 0 and the temporal direct vector TMVL1 in the prediction direction 1). Furthermore, the temporal direct vector calculation unit 114 assigns each of the temporal direct vectors in the respective prediction directions with a value of a corresponding predictive motion vector index.

More specifically, the temporal direct vector calculation unit 114 generates a first prediction vector (TVML0) that corresponds to a first reference picture list of the current block, using a first reference motion vector that corresponds to the first picture list out of two reference motion vectors of the co-located block. Furthermore, the temporal direct vector calculation unit 114 generates a second prediction vector (TVML1) that corresponds to a second reference picture list of the current block, using a second reference motion vector that corresponds to the second picture list out of two reference motion vectors of the co-located block.

Here, in general, when the predictive motion vector index has a small value, the required amount of information is small, and when the predictive motion vector index has a large value, the required amount of information is large. Accordingly, assigning a small predictive motion vector index to a motion vector which is highly likely to become a more accurate motion vector will increase the coding efficiency.

When the co-located block does not have two forward or backward reference motion vectors, the temporal direct vector calculation unit 114 determines, based on whether the co-located block is a forward reference block or a backward reference block, a motion vector of the co-located block which is to be used in temporal direct.

When the co-located block is a backward reference block, the temporal direct vector calculation unit 114 derives a candidate predictive motion vector (the temporal direct vector TMVL0 in the prediction direction 0 and the temporal direct vector TMVL1 in the prediction direction 1) by way of temporal direct using a forward reference motion vector of the co-located block. It is to be noted that when the co-located block has no forward reference motion vector, the temporal direct vector calculation unit 114 derives a candidate predictive motion vector (the temporal direct vector TMVL0 in the prediction direction 0 and the temporal direct vector TMVL1 in the prediction direction 1) by way of temporal direct using a backward reference motion vector of the co-located block.

When the co-located block is a forward reference block, the temporal direct vector calculation unit 114 derives a candidate predictive motion vector (the temporal direct vector TMVL0 in the prediction direction 0 and the temporal direct vector TMVL1 in the prediction direction 1) by way of temporal direct using a backward reference motion vector of the co-located block. It is to be noted that when the co-located block has no backward reference motion vector, the temporal direct vector calculation unit 114 derives a candidate predictive motion vector (the temporal direct vector TMVL0 in the prediction direction 0 and the temporal direct vector TMVL1 in the prediction direction 1) by way of temporal direct using a forward reference motion vector of the co-located block.

Next, the inter prediction unit 110 codes the current picture based on inter prediction using the motion vector derived through motion estimation. Furthermore, the inter prediction control unit 112 determines that the motion vector in each of the prediction directions is coded using the predictive motion vector which has the smallest error out of the candidate predictive motion vectors in the respective prediction directions. For example, the inter prediction control unit 112 determines, as errors, values of difference between candidate predictive motion vectors and the motion vector derived through motion estimation, and determines that one of the candidate predictive motion vectors which has the smallest error is used to code the motion vector. The variable-length coding unit 116 then performs the variable-length coding on the predictive motion vector index which corresponds to the selected one of the candidate predictive motion vectors, and the error information on the determined candidate predictive motion vector, together with the quantized coefficient and the like (S13).

Figure 3A:
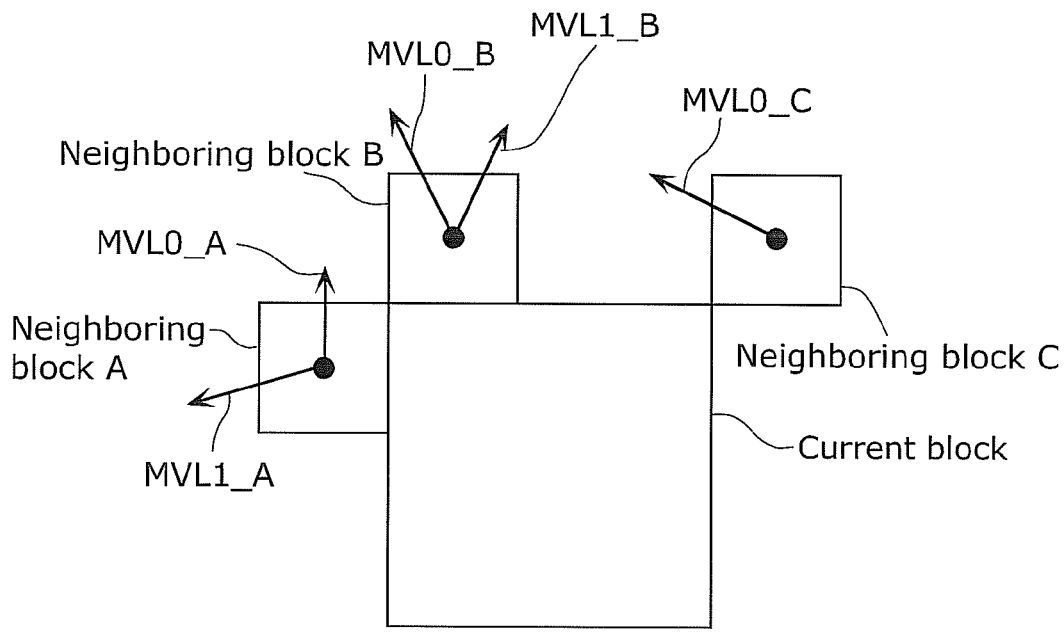
FIG. 3A shows an example of candidate predictive motion vectors.

FIG. 3A shows an example of the candidate predictive motion vector. Motion vectors MVL0_A and MVL1_A are a motion vector in the prediction direction 0 and a motion vector in the prediction direction 1, respectively, of a neighboring block A located next to the left of the current block. Motion vectors MVL0_B and MVL1_B are a motion vector in the prediction direction 0 and a motion vector in the prediction direction 1, respectively, of a neighboring block B immediately above the current block. A motion vector MVL0_C is a motion vector in the prediction direction 0 of a neighboring block C located next to the upper right of the current block. The neighboring blocks A and B use the bidirectional prediction while the neighboring block C uses the unidirectional prediction. Median (MVLX_A, MVLX_B, MVLX_C) of a prediction direction X (X=0, 1) indicates an intermediate value of the motion vectors MVLX_A, MVLX_B, and MVLX_C. Here, the intermediate value is derived as follows, for example.

[Math. 1]

$$\text{Median}(x, y, z) = x + y + z - \text{Min}(x, \text{Min}(y, z)) - \text{Max}(x, \text{Max}(y, z)) \quad \text{(Expression 1)}$$

[Math. 2]

$$\text{Min}(x, y) = \begin{cases} x & (x \leq y) \\ y & (x > y) \end{cases} \quad \text{(Expression 2)}$$

[Math. 3]

$$\text{Max}(x, y) = \begin{cases} x & (x \geq y) \\ y & (x < y) \end{cases} \quad \text{(Expression 3)}$$

The predictive motion vector index of the prediction direction 0 has a value 0 for Median (MVL0_A, MVL0_B, MVL0_C), a value 1 for the motion vector MVL0_A, a value 2 for the motion vector MVL0_B, a value 3 for the motion vector MVL0_C, and a value 4 for the temporal direct vector TMVL0. The predictive motion vector index of the prediction direction 1 has a value 0 for Median (MVL1_A, MVL1_B, 0), a value 1 for the motion vector MVL1_A, a value 2 for the motion vector MVL1_B, and a value 3 for the temporal direct vector TMVL1.

It is to be noted that the method of assigning predictive motion vector indices is not limited to this example. For example, it is conceivable that the assignment of the predictive motion vector indices may be switched according to the reference direction of the motion vector of the co-located block. Specific examples are shown in FIGS. 3B to 3E.

FIG. 3B shows an example of the assignment of the predictive motion vector indices which is applied when the co-located block has two motion vectors both of which are forward reference motion vectors (hereinafter referred to as "two forward reference motion vectors") or backward reference motion vectors (hereinafter referred to as "two backward reference motion vectors") and the reference direction of each of the motion vectors agrees with the direction toward the current picture including the current block. In this case, there is a possibility that the temporal direct vector TMVLX in the prediction direction X, calculated from each of the motion vectors, is more accurate than other candidate predictive motion vectors. The temporal direct vector TMVLX is therefore assigned with a smaller predictive motion vector index as shown in FIG. 3B.

FIG. 3C shows an example of the assignment of the predictive motion vector indices which is applied when the co-located block has two motion vectors both of which are forward or backward reference motion vectors and the reference direction of each of the motion vectors is opposite to the direction toward the current picture including the current block. In this case, rather than the temporal direct vector in the prediction direction X, calculated from each of the motion vectors, other candidate predictive motion vectors are assigned with smaller predictive motion vector indices.

FIG. 3D shows an example of the assignment of the predictive motion vector indices which is applied when the co-located block has a motion vector which is a forward or backward reference motion vector and the reference direction of the motion vector is the direction toward the current picture including the current block. In this case, there is a possibility that the temporal direct vector in the prediction direction X, calculated from the motion vector, is more accurate than other candidate predictive motion vectors. The temporal direct vector is therefore assigned with a smaller predictive motion vector index as shown in FIG. 3D.

FIG. 3E shows an example of the assignment of the predictive motion vector indices which is applied when the co-located block has a motion vector which is a forward or backward reference motion vector and the reference direction of the motion vector is opposite to the direction toward the current picture including the current block. In this case, rather than the temporal direct vector in the prediction direction X, calculated from the motion vector, other candidate predictive motion vectors are assigned with smaller predictive motion vector indices.

As above, switching between different ways of assigning the predictive motion vector indices according to the reference direction of the motion vector of the co-located block makes it possible to assign a small predictive motion vector index to a candidate prediction motion vector which is likely to provide high prediction accuracy, so that the coding efficiency can be improved.

FIG. 4 shows an example of a code table which is used in the case of performing variable-length coding on the predictive motion vector indices. In the example of FIG. 4, codes shorter in code length are assigned with the predictive motion vector indices in ascending order of the value thereof. Thus, assigning a small predictive motion vector index to a candidate predictive motion vector which is likely to provide high prediction accuracy allows improvement in coding efficiency.

Figure 5:
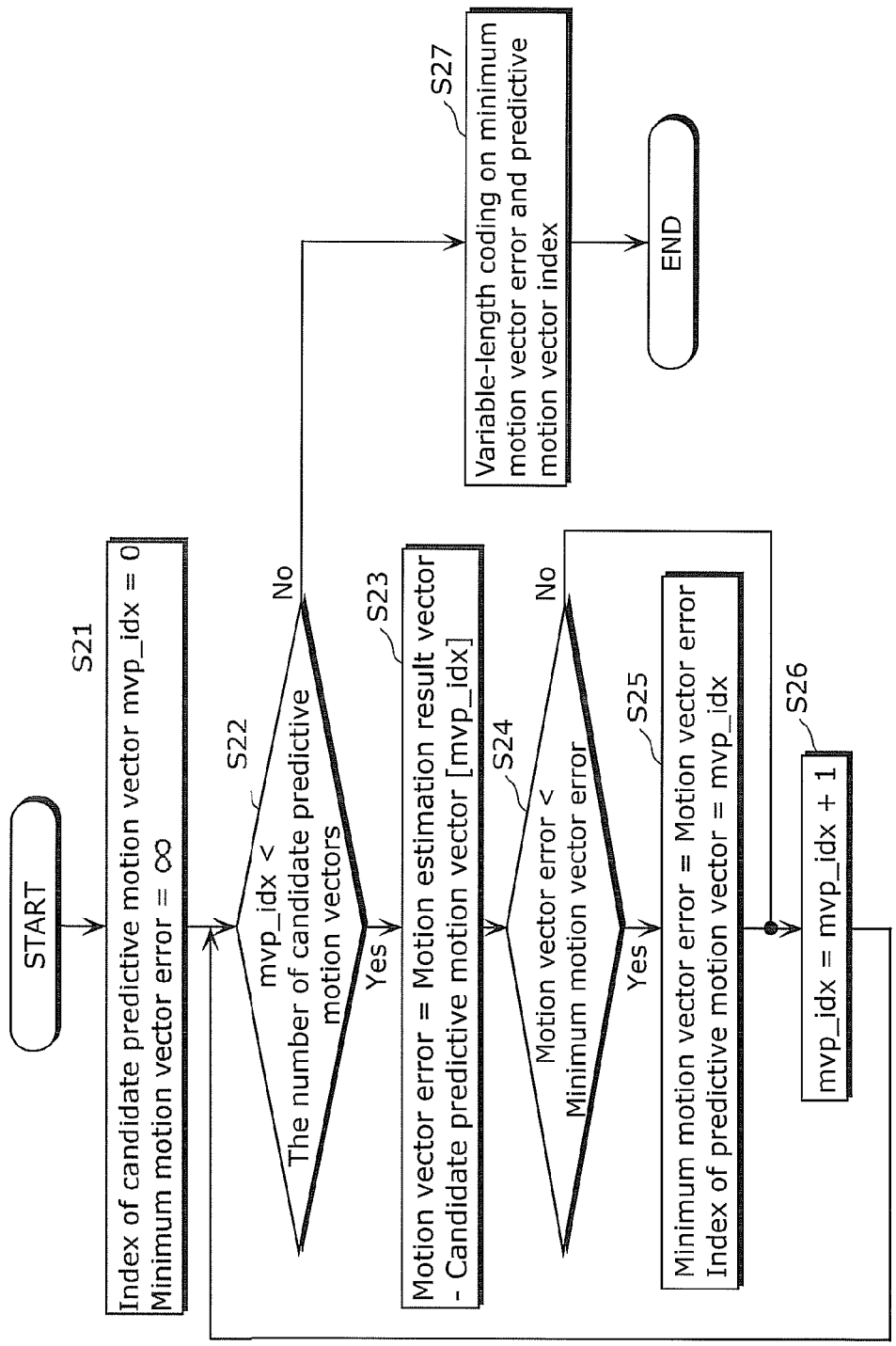
FIG. 5 shows a flow of determining a candidate predictive motion vector.

FIG. 5 shows a flow of determining a candidate predictive motion vector in the inter prediction control unit 112. In the flow shown in FIG. 5, the inter prediction control unit 112 determines that, out of a plurality of candidate predictive motion vectors, a predictive motion vector which has the smallest error relative to the motion vector in each of the prediction directions derived through motion estimation is to be used in coding of the motion vector in the prediction direction. The variable-length coding unit 116 performs variable-length coding on the error information on the determined candidate predictive motion vector and the predictive motion vector index which indicates the determined predictive motion vector.

Specifically, first, the inter prediction control unit 112 initializes an index of candidate predictive motion vector mvp_idx and a minimum motion vector error (S21). Next, the inter prediction control unit 112 compares the index of candidate predictive motion vector mvp_idx and the number of candidate predictive motion vectors (the number of records in the table shown in FIG. 3) (S22).

When mvp_idx<the number of candidate predictive motion vectors (Yes in S22), the inter prediction control unit 112 calculates a motion vector error (error information) using one of the plurality of candidate predictive motion vectors (S23). For example, the inter prediction control unit 112 calculates the motion vector error by subtracting the predictive motion vector assigned with the predictive motion vector index=0 in FIG. 3 from the motion vector used in coding of the current block.

Next, the inter prediction control unit 112 compares the motion vector error calculated in Step S23 with the minimum motion vector error (S24). When the motion vector error<the minimum motion vector error (Yes in S24), the inter prediction control unit 112 sets (overwrites), as (on top of) the minimum motion vector error, the motion vector error calculated in Step S23, and sets (overwrites) the current mvp_idx as (on top of) the predictive motion vector index (S25). When the motion vector error the minimum motion vector error (No in S24), Step S25 is skipped.

Subsequently, the inter prediction control unit 112 increments mvp_idx by 1 (S26) and repeatedly executes each of the above processes (Steps S22 to S26) the number of times equal to the number of candidate predictive motion vectors. The inter prediction control unit 112 then outputs the values set as the minimum motion vector error and the predictive motion vector index, to the variable-length coding unit 118 at a point in time of mvp_idx=the number of candidate predictive motion vectors (S22), and brings the processing of FIG. 5 to the end (S27).

Figure 6:
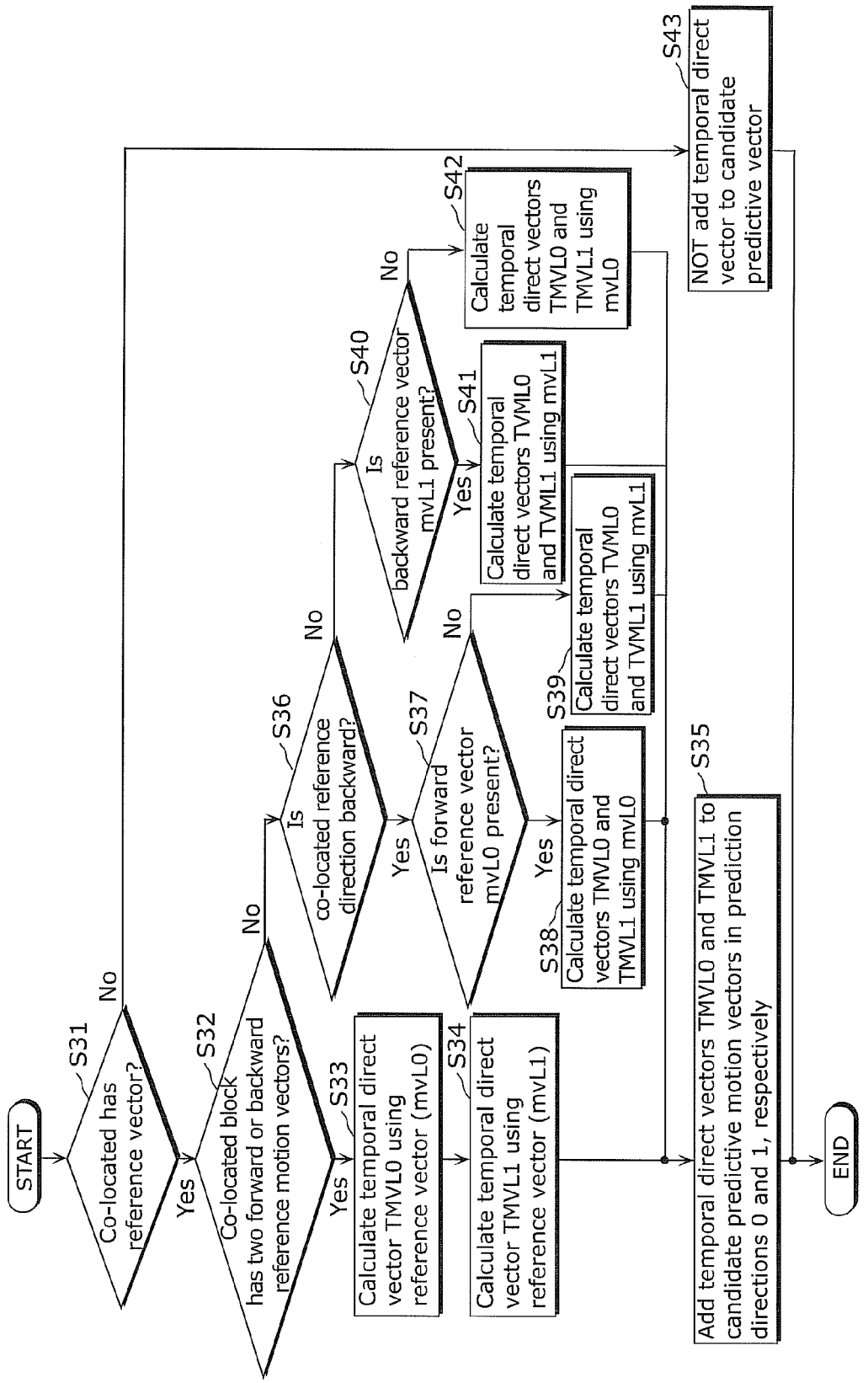
FIG. 6 shows in detail the flow of processing in Step S12 of FIG. 2.

FIG. 6 shows in detail the flow of processing in Step S12 of FIG. 2. The following describes about FIG. 6.

First, the temporal direct vector calculation unit 114 determines whether or not the co-located block has a reference motion vector (S31). When it is determined that the co-located block has a reference motion vector (Yes in S31), the temporal direct vector calculation unit 114 determines whether or not the co-located block has two forward or backward reference motion vectors (S32).

When it is determined that the co-located block has two forward or backward reference motion vectors (Yes in S32), the temporal direct vector calculation unit 114 derives the temporal direct vector TMVL0 in the prediction direction 0 by way of temporal direct using the motion vector (mvL0) of the co-located block (S33). Furthermore, the temporal direct vector calculation unit 114 derives the temporal direct vector TMVL1 in the prediction direction 1 by way of temporal direct using the motion vector (mvL1) of the co-located block (S34). The temporal direct vector calculation unit 114 then adds the temporal direct vectors TMVL0 and TMVL1 to respective candidate predictive motion vectors in the prediction directions 0 and 1 (S35).

When it is determined that the co-located block does not have two forward or backward reference motion vectors (No in S32), the temporal direct vector calculation unit 114 determines whether or not the co-located block is a backward reference block (S36).

When it is determined that the co-located block is a backward reference block (Yes in S36), the temporal direct vector calculation unit 114 determines whether or not the co-located block has a forward reference motion vector (mvL0) (S37). When it is determined that the co-located block has a forward reference motion vector (mvL0) (Yes in S37), the temporal direct vector calculation unit 114 derives the temporal direct vector TMVL0 in the prediction direction 0 and the temporal direct vector TMVL1 in the prediction direction 1 by way of temporal direct using the forward reference motion vector (mvL0) (S38) and adds them to the candidate predictive motion vectors in the prediction directions 0 and 1 (S35).

When it is determined that the co-located block has no forward reference motion vector (mvL0) (No in S37), the temporal direct vector calculation unit 114 derives the temporal direct vector TMVL0 in the prediction direction 0 and the temporal direct vector TMVL1 in the prediction direction 1 by way of temporal direct using the backward reference motion vector (mvL1) of the co-located block (S39) and adds them to the candidate predictive motion vectors in the prediction directions 0 and 1 (S35).

When it is determined that the co-located block is not a backward reference block, that is, the co-located block is a forward reference block (No in S36), the temporal direct vector calculation unit 114 determines whether or not the co-located block has a backward reference motion vector (mvL1) (S40).

When it is determined that the co-located block has a backward reference motion vector (mvL1) (Yes in S40), the temporal direct vector calculation unit 114 derives the temporal direct vector TMVL0 in the prediction direction 0 and the temporal direct vector TMVL1 in the prediction direction 1 by way of temporal direct using the backward reference motion vector (mvL1) (S41) and adds them to the candidate predictive motion vectors in the prediction directions 0 and 1 (S35).

When it is determined that the co-located block has no backward reference motion vector (mvL1) (No in S40), the temporal direct vector calculation unit 114 derives the temporal direct vector TMVL0 in the prediction direction 0 and the temporal direct vector TMVL1 in the prediction direction 1 by way of temporal direct using the forward reference motion vector (mvL0) of the co-located block (S42) and adds them to the candidate predictive motion vectors in the prediction directions 0 and 1 (S35).

Furthermore, when it is determined that the co-located block has no reference motion vectors (mvL0, mvL1) (No in S31), the temporal direct vector calculation unit 114 avoids the temporal direct-based derivation of a candidate predictive motion vector (S43).

Next, a method of deriving a motion vector by way of temporal direct is described in detail.

Figure 7A:
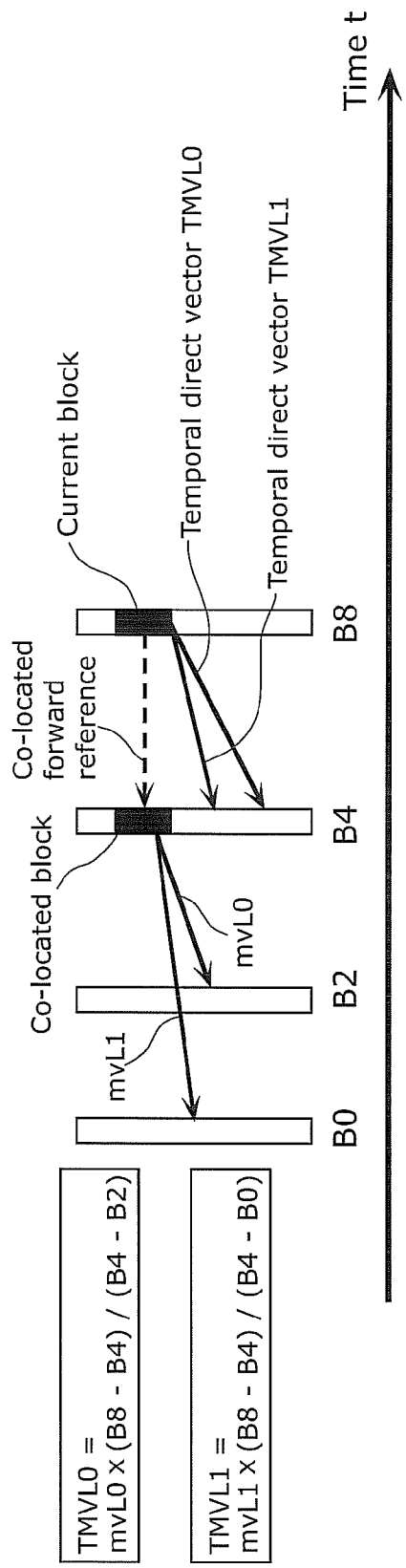
FIG. 7A shows an example of a method of calculating a temporal direct vector, which is applied in the case where the co-located block has two forward reference motion vectors.

FIG. 7A shows an example of a method of calculating a temporal direct vector, which is applied in the case where the co-located block has two forward reference motion vectors, namely, two forward reference motion vectors mvL0 and mvL1. In the case of FIG. 7A, the temporal direct vector calculation unit 114 derives the temporal direct vector TMVL0 in the prediction direction 0 and the temporal direct vector TMVL1 in the prediction direction 1 by way of temporal direct using the respective motion vectors. Specifically, the temporal direct vector calculation unit 114 derives the temporal direct vector TMVL0 in the prediction direction 0 and the temporal direct vector TMVL1 in the prediction direction 1 according to the following Expression 4 and Expression 5.

$$TMVL0 = mvL0 \times (B8-B4)/(B4-B2) \quad \text{(Expression 4)}$$

$$TMVL1 = mvL1 \times (B8-B4)/(B4-B0) \quad \text{(Expression 5)}$$

Here, (B4−B2) represents information on a difference in display time between the picture B4 and the picture B2. (B4−B0) represents information on a difference in display time between the picture B4 and the picture B0. (B8−B4) represents information on a difference in display time between the picture B8 and the picture B4.

Figure 7B:
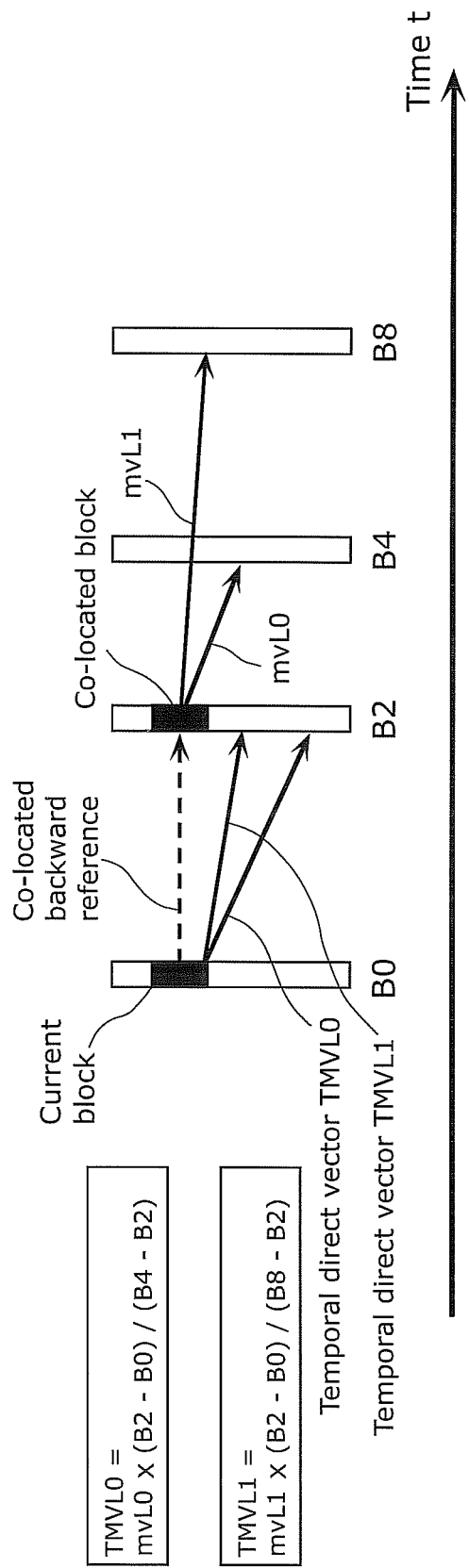
FIG. 7B shows an example of a method of calculating a temporal direct vector, which is applied in the case where the co-located block has two backward reference motion vectors.

FIG. 7B shows an example of a method of calculating a temporal direct vector, which is applied in the case where the co-located block has two backward reference motion vectors, namely, two backward reference motion vectors mvL0 and mvL1. In the case of FIG. 7B, the temporal direct vector calculation unit 114 derives the temporal direct vector TMVL0 in the prediction direction 0 and the temporal direct vector TMVL1 in the prediction direction 1 by way of temporal direct using the respective motion vectors. Specifically, the temporal direct vector calculation unit 114 derives the temporal direct vector TMVL0 in the prediction direction 0 and the temporal direct vector TMVL1 in the prediction direction 1 according to the following Expression 6 and Expression 7.

$$TMVL0 = mvL0 \times (B2-B0)/(B4-B2) \quad \text{(Expression 6)}$$

$$TMVL1 = mvL1 \times (B2-B0)/(B8-B2) \quad \text{(Expression 7)}$$

Here, (B4−B2) represents information on a difference in display time between the picture B4 and the picture B2. (B8−B2) represents information on a difference in display time between the picture B8 and the picture B2. (B2−B0) represents information on a difference in display time between the picture B2 and the picture B0.

FIG. 8A shows an example of a method of calculating a temporal direct vector, which is applied in the case where the co-located block is a backward reference block and has both a forward reference motion vector and a backward reference motion vector. In the case of FIG. 8A, the temporal direct vector calculation unit 114 derives the temporal direct vector TMVL0 in the prediction direction 0 and the temporal direct vector TMVL1 in the prediction direction 1 by way of temporal direct using the forward reference motion vector. Specifically, the temporal direct vector calculation unit 114 derives, using the forward reference motion vector, the temporal direct vector TMVL0 in the prediction direction 0 and the temporal direct vector TMVL1 in the prediction direction 1 according to the following Expression 8 and Expression 9.

$$TMVL0 = mvL0 \times (B2-B0)/(B4-B0) \quad \text{(Expression 8)}$$

$$TMVL1 = mvL0 \times (B2-B4)/(B4-B0) \quad \text{(Expression 9)}$$

Here, (B2−B0) represents information on a difference in display time between the picture B2 and the picture B0. (B2−B4) represents information on a difference in display time between the picture B2 and the picture B4. (B4−B0) represents information on a difference in display time between the picture B4 and the picture B0.

FIG. 8B shows an example of calculating a temporal direct vector, which is applied in the case where the co-located block is a backward reference block and has a backward reference motion vector only. In the case of FIG. 8B, the temporal direct vector calculation unit 114 derives the temporal direct vector TMVL0 in the prediction direction 0 and the temporal direct vector TMVL1 in the prediction direction 1 by way of temporal direct using the backward reference motion vector. Specifically, the temporal direct vector calculation unit 114 derives, using the backward reference motion vector, the temporal direct vector TMVL0 in the prediction direction 0 and the temporal direct vector TMVL1 in the prediction direction 1 according to the following Expression 10 and Expression 11.

$$TMVL0 = mvL1 \times (B2-B0)/(B4-B8) \quad \text{(Expression 10)}$$

$$TMVL1 = mvL1 \times (B2-B4)/(B4-B8) \quad \text{(Expression 11)}$$

Here, (B2–B0) represents information on a difference in display time between the picture B2 and the picture B0. (B2–B4) represents information on a difference in display time between the picture B2 and the picture B4. (B4–B8) represents information on a difference in display time between the picture B4 and the picture B8.

FIG. 9A shows an example of a method of calculating a temporal direct vector, which is applied in the case where the co-located block is a forward reference block and has both a forward reference motion vector and a backward reference motion vector. In the case of FIG. 9A, the temporal direct vector calculation unit 114 derives the temporal direct vector TMVL0 in the prediction direction 0 and the temporal direct vector TMVL1 in the prediction direction 1 by way of temporal direct using the backward reference motion vector. Specifically, the temporal direct vector calculation unit 114 derives, using the backward reference motion vector, a candidate predictive motion vector according to the following Expression 12 and Expression 13.

$$TMVL0 = mvL1 \times (B6-B8)/(B4-B8) \quad \text{(Expression 12)}$$

$$TMVL1 = mvL1 \times (B6-B4)/(B4-B8) \quad \text{(Expression 13)}$$

Here, (B6–B8) represents information on a difference in display time between the picture B6 and the picture B8. (B6–B4) represents information on a difference in display time between the picture B6 and the picture B4. (B4–B8) represents information on a difference in display time between the picture B4 and the picture B8.

Figure 9B:
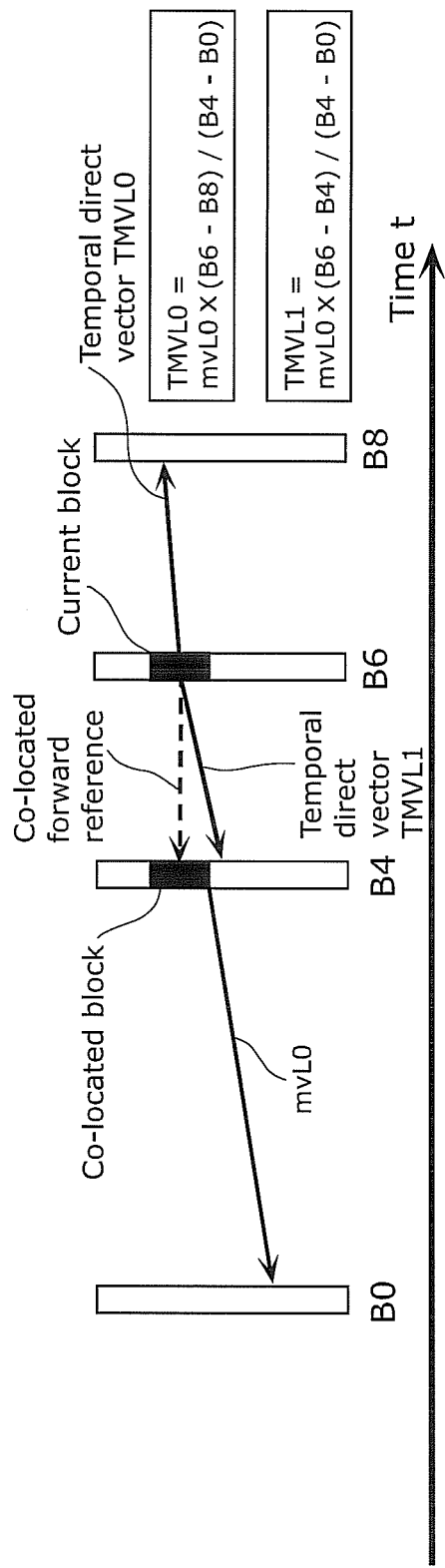
FIG. 9B shows an example of calculating a temporal direct vector, which is applied in the case where the co-located block is a forward reference block and has a forward reference motion vector only.

FIG. 9B shows an example of calculating a temporal direct vector, which is applied in the case where the co-located block is a forward reference block and has a forward reference motion vector only. In the case of FIG. 9B, the temporal direct vector calculation unit 114 derives the temporal direct vector TMVL0 in the prediction direction 0 and the temporal direct vector TMVL1 in the prediction direction 1 by way of temporal direct using the forward reference motion vector. Specifically, the temporal direct vector calculation unit 114 derives, using the backward reference motion vector, a candidate predictive motion vector according to the following Expression 14 and Expression 15.

$$TMVL0 = mvL0 \times (B6-B8)/(B4-B0) \quad \text{(Expression 14)}$$

$$TMVL1 = mvL0 \times (B6-B4)/(B4-B0) \quad \text{(Expression 15)}$$

Here, (B6–B8) represents information on a difference in display time between the picture B6 and the picture B8. (B6–B4) represents information on a difference in display time between the picture B6 and the picture B4. (B4–B0) represents information on a difference in display time between the picture B4 and the picture B0.

As above, Embodiment 1 of the present invention uses, at the time of coding a motion vector, a predictive motion vector which has the smallest error value out of a plurality of candidate predictive motion vectors, with the result that the coding efficiency can be improved. For example, the error value is a value of difference between a motion vector derived through motion estimation and a selected predictive motion vector.

Furthermore, in Embodiment 1, a reference motion vector of the co-located block to be used in temporal direct is selected according to the position of the co-located block and the number of reference motion vectors of the co-located block. This makes it possible to narrow down candidate predictive motion vectors to accurate ones and thereby possible to reduce the processing load for coding and decoding.

Specifically, when the co-located block has two forward or backward reference motion vectors, it is likely that the motion vector of the current block and the motion vector of the co-located block are approximate in the same prediction direction. Accordingly, calculating a temporal direct vector in each of the prediction directions from the motion vector of the co-located block in the same prediction direction allows improvement in the coding efficiency. More specifically, the temporal direct vector TMVL0 in the prediction direction 0 is calculated in temporal direct from the motion vector mvL0 of the co-located block in the prediction direction 0, and the temporal direct vector TMVL1 in the prediction direction 1 is calculated in temporal direct from the motion vector mvL1 of the co-located block in the prediction direction 1.

When the co-located block has both a forward reference motion vector and a backward reference motion vector, a motion vector to be used for calculation of each of the temporal direct vector TMVL0 in the prediction direction 0 and the temporal direct vector TMVL1 in the prediction direction 1 is selected according to the position of the co-located block.

For example, when the co-located block is a backward reference block, a forward reference motion vector is used. Specifically, this is because the forward reference motion vector is a motion vector directed from a picture including the co-located block toward the current picture including the current block, which is likely to have a smaller prediction error than a backward reference motion vector. When the co-located block is a forward reference block, a backward reference motion vector is used. Specifically, this is because the backward reference motion vector is a motion vector directed from the picture including the co-located block toward the current picture including the current block, which is likely to have a smaller prediction error than a forward reference motion vector.

It is to be noted that although it is determined in this Embodiment 1 whether or not the co-located block has two forward or backward reference motion vectors, it may also be possible to further determine the position of the co-located block at the same time. Specifically, in Step S32 in FIG. 6, it is determined whether the co-located block has two forward reference motion vectors when the co-located block is a forward reference block or whether the co-located block has two backward reference motion vectors when the co-located block is a backward reference block.

When the co-located block is a backward reference block, the backward reference motion vector is a motion vector which extends toward a picture located opposite the picture including the current block across the picture including the co-located block, with the result that the prediction accuracy may be reduced. In such a case, the temporal direct vector calculation unit 114 calculates, in temporal direct, the temporal direct vector TMVL0 in the prediction direction 0 from the motion vector mvL0 in the prediction direction 0, and calculates, in temporal direct, the temporal direct vector TMVL1 in the prediction direction 1 from the motion vector mvL1 in the prediction direction 1. This makes it possible to increase the prediction accuracy and reduce the processing load at the same time.

Furthermore, in Step S43 in FIG. 6, when the co-located block has no reference motion vector, no temporal direct vector is calculated. However, it is possible to calculate a temporal direct vector by using another block as the co-located block.

For example, when the co-located block is a backward reference block and has no reference motion vector, it is conceivable to use a forward reference block as the co-located block. In this case, the use of a backward reference motion vector out of the reference motion vectors of the forward reference block allows improvement in the prediction accuracy. Furthermore, when the forward reference block has no backward reference motion vector, the use of a forward reference motion vector allows a temporal direct vector to be derived.

When the co-located block is a forward reference block and has no reference motion vector, it is conceivable to use a backward reference block as the co-located block. In this case, the use of a forward reference motion vector out of the reference motion vectors of the backward reference block allows improvement in the prediction accuracy. Furthermore, when the backward reference block has no forward reference motion vector, the use of a backward reference motion vector allows a temporal direct vector to be derived.

For example, when the co-located block is a block within a picture assigned with an index 0 in the reference picture list L0 of the current picture and the co-located block specified by the index 0 in the reference picture list L0 has no reference motion vector, it is conceivable to use a reference motion vector of a co-located block specified by an index 0 in the reference picture list L1.

Furthermore, although this Embodiment 1 has described the method of calculating a temporal direct vector in which a motion vector derived through motion estimation is used as one of the candidate predictive motion vectors to be used at the time of coding, the present invention is not always limited to this embodiment. For example, as a coding mode for inter prediction of the current block in a B-picture or a P-picture in H. 264, there are a direct mode in which only a difference value of image data is coded and a motion vector is predicted based on a peripheral block or the like, and a skip mode in which no difference value of image data and no motion vector are coded and a predicted image at a position indicated by a motion vector predicted based on a peripheral block or the like is provided directly as a coded image. Also in these direct mode and skip mode, a temporal direct vector calculated by the same or like method can be applied as one of the predictive motion vectors.

Furthermore, as an inter prediction mode for the current block in a B-picture or a P-picture, there is a merge mode in which a motion vector and a reference picture index are copied from a neighboring block or a co-located block of the current block to code the current block. In the merge mode, the index of the neighboring block or the like used for the copying is added to a bit stream, which allows a motion vector and a reference picture index to be selected. Also in such merge mode, a temporal direct vector calculated by the same or like method can be applied as a predictive motion vector of the co-located block.

Furthermore, although, using the co-located reference direction flag, either the forward reference block or the backward reference block is selected as a co-located block to calculate a temporal direct vector in this Embodiment 1, the present invention is not always limited to this embodiment. For example, the forward reference block is defined as a co-located block 1, and the backward reference block is defined as a co-located block 2. It may then be possible that according to the direction of a reference motion vector or the number of reference motion vectors of each of the co-located block 1 and the co-located block 2, a temporal direct vector is calculated and added to the candidate predictive motion vectors. The use of both the co-located blocks which are the forward reference block and the backward reference block as above allows improvement in the accuracy for a temporal direct vector and thereby allows improvement in the coding efficiency.

Furthermore, in Embodiment 1, when the co-located block has two forward or backward reference motion vectors, the temporal direct vector TMVL0 in the prediction direction 0 is calculated in temporal direct from the motion vector mvL0 of the co-located block in the prediction direction 0, and the temporal direct vector TMVL1 in the prediction direction 1 is calculated in temporal direct from the motion vector mvL1 of the co-located block in the prediction direction 1. The temporal direct vectors TMVL0 and TVML1 are then added to the candidate predictive motion vectors in the respective prediction directions, but the present invention is not always limited to this embodiment. For example, it may be possible that both the calculated temporal direct vectors TMVL0 and TVML1 are added to the candidate predictive motion vectors in each of the prediction directions. This allows improvement in the accuracy of candidate predictive motion vectors and thereby allows improvement in the coding efficiency.

Embodiment 2

In this Embodiment 2, Step S52 is different from Step S32 in Embodiment 1. The following descriptions focus on the differences from Embodiment 1.

Figure 10:
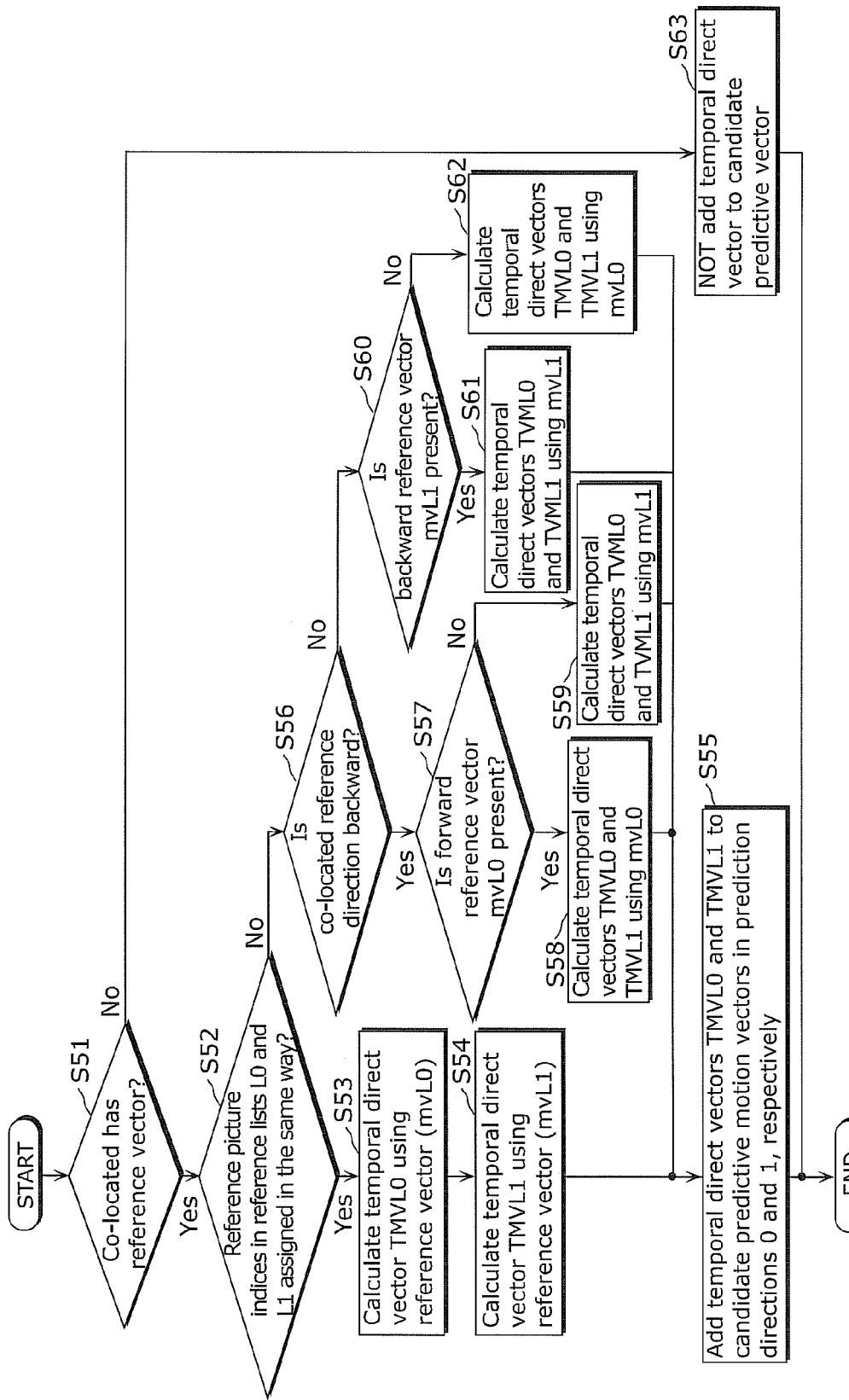
FIG. 10 shows in detail another example of the flow of processing in Step S12 of FIG. 2.

In Step S52 of FIG. 10, it is determined whether reference pictures in the reference lists L0 and L1 of a coded picture are assigned with reference picture indices in the same way. Generally, in the reference list L1, pictures located after the current picture in display time order are assigned with reference picture indices. Meanwhile, in the reference list L0, pictures located before the current picture in display time order are assigned with reference picture indices. Accordingly, when the reference pictures in the reference lists L1 and L0 of a coded picture are assigned with reference picture indices in the same way, the reference direction is limited to either one of the forward and backward directions in display order from the current picture.

More specifically, when it is determined that the reference pictures in the reference lists L0 and L1 of a coded picture are assigned with reference picture indices in the same way (Yes in S52), the temporal direct vector calculation unit 114 derives the temporal direct vector TMVL0 in the prediction direction 0 and the temporal direct vector TMVL1 in the prediction direction 1 by way of temporal direct using the reference motion vectors mvL0 and mvL1 of a co-located block (S53, S54).

It is likely that the motion vector of the current block and the motion vector of the co-located block are approximate in the same prediction direction. Accordingly, calculating a temporal direct vector in each of the prediction directions from the motion vector of the co-located block in the same prediction direction allows improvement in the coding efficiency. More specifically, the temporal direct vector calculation unit 114 calculates, in temporal direct, the temporal direct vector TMVL0 in the prediction direction 0 from the motion vector mvL0 of the co-located block in the prediction direction 0, and calculates, in temporal direct, the temporal direct vector TMVL1 in the prediction direction 1 from the motion vector mvL1 of the co-located block in the prediction direction 1.

When the co-located block has only one of the reference motion vectors mvL0 and mvL1 (No in S52), the temporal direct vector calculation unit 114 derives the temporal direct vector TMVL0 in the prediction direction 0 and the temporal direct vector TMVL 1 in the prediction direction 1 by way of temporal direct using only one of the reference motion vectors mvL0 and mvL1 (S56 to S62). Processing subsequent to Step S56 is the same as Steps S36 to S42 of Embodiment 1 and therefore not described.

Thus, in Embodiment 2 of the present invention, the processing load for coding and decoding is reduced by making determinations based on the reference lists. Since the reference lists are held by each picture, the determination is made per picture. This means that the determination per block is no longer necessary, which allows a reduction in the processing load.

It is to be noted that although the temporal direct vector TMVL0 in the prediction direction 0 is calculated in temporal direct from the motion vector mvL0 of a co-located block in the prediction direction 0 and the temporal direct vector TMVL1 in the prediction direction 1 is calculated in temporal direct from the motion vector mvL1 in the prediction direction 1 when the reference pictures in the reference lists L0 and L1 are assigned with reference picture indices in the same way in this Embodiment 2, the present invention is not limited to this embodiment.

For example, it may be possible that when reference pictures in the reference lists L0 and L1 of a reference picture including a co-located block are assigned with reference picture indices in the same way, the temporal direct vector TMVL0 in the prediction direction 0 is calculated in temporal direct from the motion vector mvL0 of the co-located block in the prediction direction 0, and the temporal direct vector TMVL1 in the prediction direction 1 is calculated in temporal direct from the motion vector mvL1 of the co-located block in the prediction direction 1.

As yet another example, it may also be possible that when all the reference pictures held in the reference lists L0 and L1 of a coded picture are located before the current picture in display order or located after the current picture in display order, the temporal direct vector TMVL0 in the prediction direction 0 is calculated in temporal direct from the motion vector mvL0 of the co-located block in the prediction direction 0, and the temporal direct vector TVML1 in the prediction direction 1 is calculated in temporal direct from the motion vector mvL1 of the co-located block in the prediction direction 1.

Embodiment 3

Figure 11:
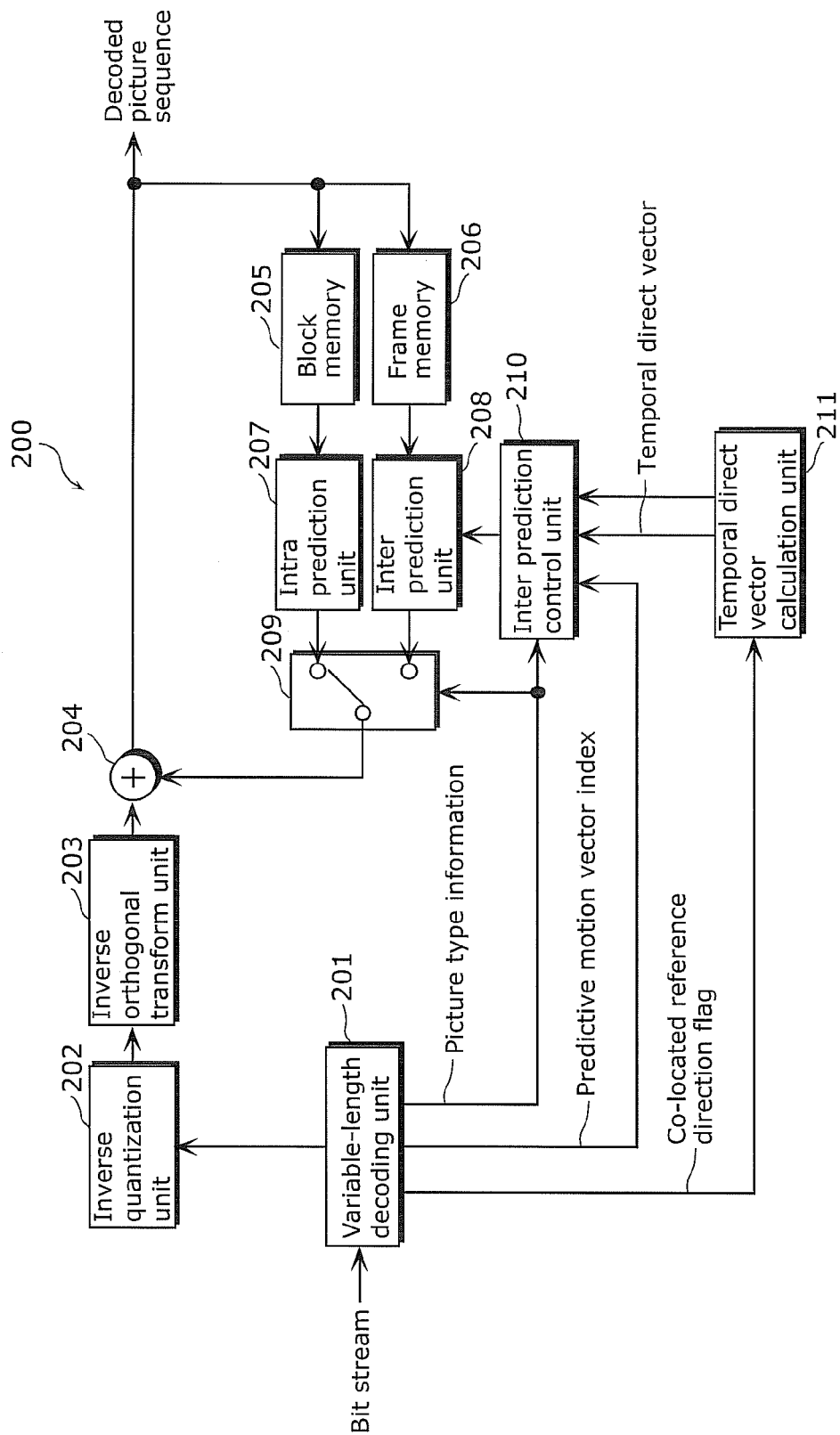
FIG. 11 is a block diagram showing a moving picture decoding apparatus according to Embodiment 3.
Figure 12:
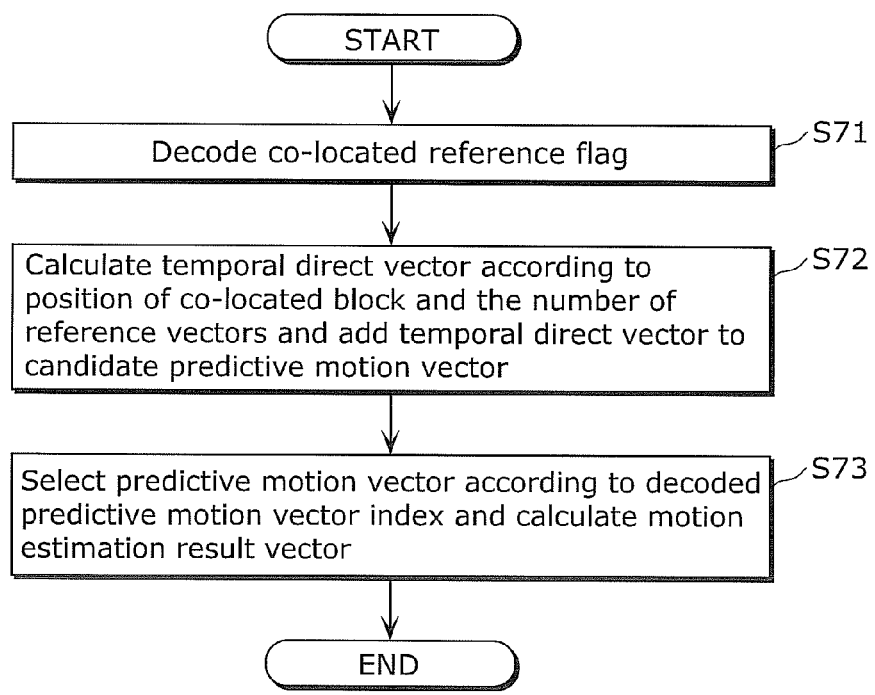
FIG. 12 shows an outline of a processing flow of a moving picture decoding method according to Embodiment 3.
Figure 13:
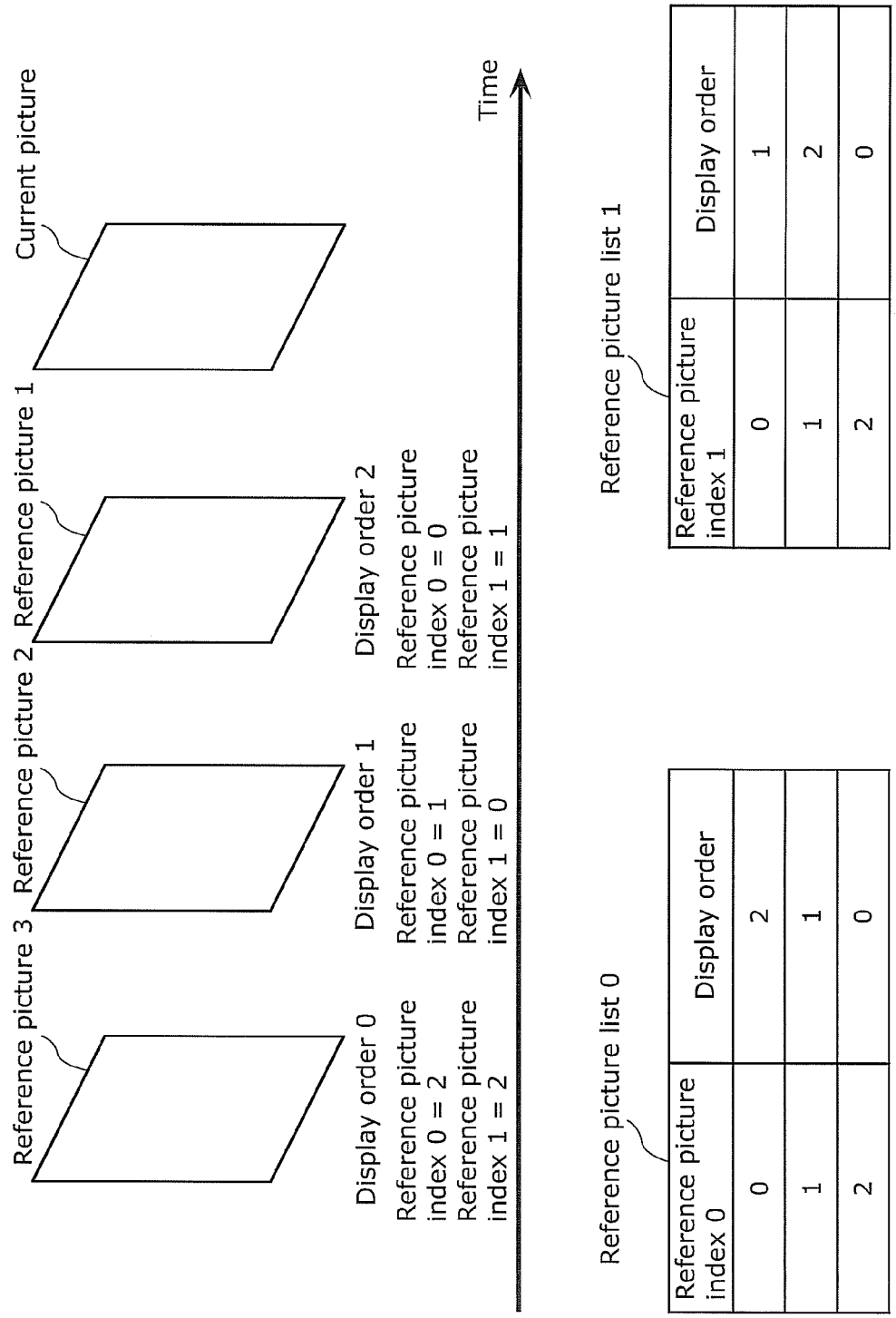
FIG. 13 shows an example of reference picture lists in a B-picture.
Figure 14:
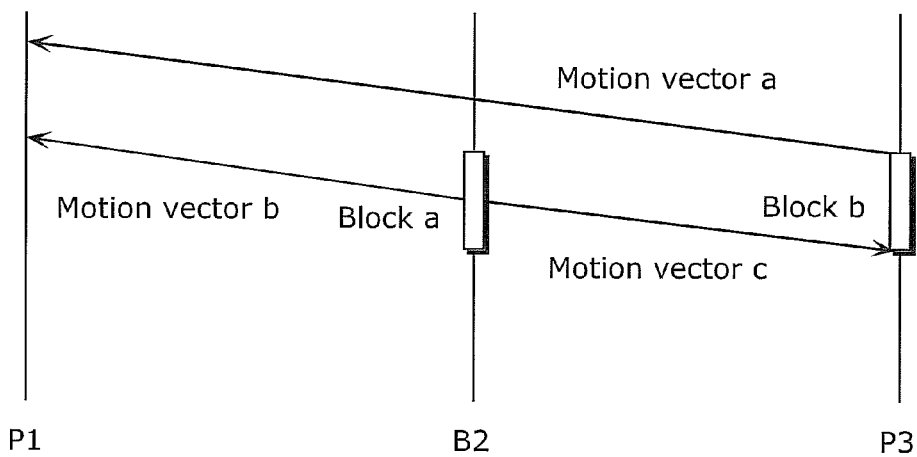
FIG. 14 illustrates an inter prediction coding method in temporal direct.

Next, with reference to FIGS. 11 and 12, a moving picture decoding method and a moving picture decoding apparatus according to Embodiment 3 are described. Detailed descriptions in common with Embodiment 1 are omitted while the differences from Embodiment 1 are mainly described.

FIG. 11 is a block diagram showing a moving picture decoding apparatus according to Embodiment 3 of the present invention.

In Embodiment 3, a block included in a picture which is located, in display time order, before a current picture to be decoded is referred to as a forward reference block. A block included in a picture which is located after the current picture in display time order is referred to as a backward reference block.

A moving picture decoding apparatus 200 includes, as shown in FIG. 11, a variable-length decoding unit 201, an inverse quantization unit 202, an inverse orthogonal transform unit 203, an adding unit 204, a block memory 205, a frame memory 206, an intra prediction unit 207, an inter prediction unit 208, a switch 209, an inter prediction control unit 210, and a temporal direct vector calculation unit 211. This moving picture decoding apparatus 200 decodes a bit stream, for example, output from the moving picture coding apparatus 100 according to Embodiment 1.

The variable-length decoding unit 201 performs variable-length decoding on the received bit stream, outputs quantized coefficients to the inverse quantization unit 202, outputs picture type information to the switch 209 and the inter prediction control unit 210, outputs a predictive motion vector index to the inter prediction control unit 210, and outputs a co-located reference direction flag to the temporal direct vector calculation unit 211.

The inverse quantization unit 202 reconstructs a transform coefficient by inversely quantizing the quantized coefficient obtained from the variable-length decoding unit 201 and outputs the reconstructed transform coefficient to the inverse orthogonal transform unit 203. The inverse orthogonal transform unit 203 reconstructs a residual block by transforming, from the frequency domain to the image domain, the reconstructed transform coefficient obtained from the inverse quantization unit 202, and outputs the reconstructed residual block to the adding unit 204.

The adding unit 204 reconstructs a decoded block by adding the reconstructed residual block obtained from the inverse orthogonal transform unit 203 and a prediction block obtained from the switch 209. The adding unit 204 then outputs, to the outside of the apparatus, a decoded picture sequence including the decoded block reconstructed as above and stores the decoded picture sequence into the block memory 205 and the frame memory 206. The block memory 205 stores, per block, the decoded picture sequence obtained from the adding unit 204. The frame memory 206 stores, per frame, the decoded picture sequence obtained from the adding unit 204.

The intra prediction unit 207 performs intra prediction using the decoded block-by-block picture sequence stored in the block memory 205, to generate a prediction block of the current block and outputs the generated prediction block to the switch 209. The inter prediction unit 208 performs inter prediction using the decoded frame-by-frame picture sequence stored in the frame memory 206, to generate a prediction block of the current block and outputs the generated prediction block to the switch. The switch 209 outputs, to the adding unit 204, the prediction block generated by the intra prediction unit 207 or the prediction block generated by the inter prediction unit 208.

The temporal direct vector calculation unit 211 derives a candidate predictive motion vector by way of temporal direct using the co-located reference direction flag obtained from the variable-length decoding unit 201. Specifically, when the co-located block identified by the co-located reference direction flag has two forward or backward reference motion vectors, the temporal direct vector calculation unit 211 derives the temporal direct vector TMVL0 in the prediction direction 0 and the temporal direct vector TMVL1 in the prediction direction 1 by way of temporal direct using the two motion vectors of the co-located block. Furthermore, the temporal direct vector calculation unit 211 assigns each of the temporal direct vectors in the respective prediction directions with a value of a corresponding predictive motion vector index.

When the co-located block identified by the co-located reference direction flag does not have two forward or backward reference motion vectors, the temporal direct vector calculation unit 211 determines, based on whether the co-located block is a forward reference block or a backward reference block, a motion vector of the co-located block which is to be used in temporal direct.

Specifically, when the co-located block is a backward reference block, the temporal direct vector calculation unit 211 derives the temporal direct vector TMVL0 in the prediction direction 0 and the temporal direct vector TMVL1 in the prediction direction 1 by way of temporal direct using a forward reference motion vector of the co-located block. It is to be noted that when the co-located block has no forward reference motion vector, the temporal direct vector calculation unit 211 derives the temporal direct vector TMVL0 in the prediction direction 0 and the temporal direct vector TMVL1 in the prediction direction 1 by way of temporal direct using a backward reference motion vector of the co-located block.

When the co-located block is a forward reference block, the temporal direct vector calculation unit 211 derives the temporal direct vector TMVL0 in the prediction direction 0 and the temporal direct vector TMVL1 in the prediction direction 1 by way of temporal direct using a backward reference motion vector of the co-located block. It is to be noted that when the co-located block has no backward reference motion vector, the temporal direct vector calculation unit 211 derives the temporal direct vector TMVL0 in the prediction direction 0 and the temporal direct vector TMVL1 in the prediction direction 1 by way of temporal direct using a forward reference motion vector of the co-located block.

The inter prediction control unit 208 specifies, out of a plurality of candidate predictive motion vectors, a predictive motion vector which corresponds to the predictive motion vector index obtained from the variable-length decoding unit 201. The inter prediction control unit 210 then adds, to the specified predictive motion vector, error information on the predictive motion vector relative to the motion vector, to thereby calculate a motion vector which is to be used for inter prediction.

FIG. 12 shows an outline of a processing flow of the moving picture decoding method according to Embodiment 3 of the present invention.

First, the variable-length decoding unit 201 performs variable-length decoding on the co-located reference direction flag per picture (S71). The variable-length decoding unit 201 then outputs the decoded co-located reference direction flag to the temporal direct vector calculation unit 211.

Next, the temporal direct vector calculation unit 211 determines, based on the decoded co-located reference direction flag, whether a forward reference block is to be a co-located block or a backward reference block is to be a co-located block. Furthermore, the temporal direct vector calculation unit 211 derives a temporal direct vector by way of temporal direct using a reference motion vector of the co-located block. The temporal direct vector calculation unit 211 then outputs, as a candidate predictive motion vector, the derived temporal direct vector to the inter prediction control unit 210 (S72).

Specifically, when the co-located block has two forward or backward reference motion vectors, the temporal direct vector calculation unit 211 derives the temporal direct vector TMVL0 in the prediction direction 0 and the temporal direct vector TMVL1 in the prediction direction 1 by way of temporal direct using the two motion vectors of the co-located block. Furthermore, the temporal direct vector calculation unit 211 assigns each of the temporal direct vectors in the respective prediction directions with a value of a corresponding predictive motion vector index. The predictive motion vector indices are assigned according to the method of assigning predictive motion vector indices in Embodiment 1.

When the co-located block does not have two forward or backward reference motion vectors, the temporal direct vector calculation unit 211 determines, based on whether the co-located block is a forward reference block or a backward reference block, a motion vector of the co-located block which is to be used in temporal direct.

Specifically, when the co-located block is a backward reference block, the temporal direct vector calculation unit 211 derives the temporal direct vector TMVL0 in the prediction direction 0 and the temporal direct vector TMVL1 in the prediction direction 1 by way of temporal direct using a forward reference motion vector of the co-located block. It is to be noted that when the co-located block has no forward reference motion vector, the temporal direct vector calculation unit 211 derives the temporal direct vector TMVL0 in the prediction direction 0 and the temporal direct vector TMVL1 in the prediction direction 1 by way of temporal direct using a backward reference motion vector.

When the co-located block is a forward reference block, the temporal direct vector calculation unit 211 derives the temporal direct vector TMVL0 in the prediction direction 0 and the temporal direct vector TMVL1 in the prediction direction 1 by way of temporal direct using a backward reference motion vector of the co-located block. It is to be noted that when the co-located block has no backward reference motion vector, the temporal direct vector calculation unit 211 derives the temporal direct vector TMVL0 in the prediction direction 0 and the temporal direct vector TMVL1 in the prediction direction 1 by way of temporal direct using a forward reference motion vector.

Next, the inter prediction control unit 210 determines, out of a plurality of candidate predictive motion vectors, a motion vector which is used for inter prediction, based on the predictive motion vector index obtained from the variable-length decoding unit 201. Furthermore, the inter prediction control unit adds the error information to the determined predictive motion vector, derives a motion vector, and outputs the derived motion vector to the inter prediction unit 208 (S73). The inter prediction unit 208 performs inter prediction using a motion vector obtained from the inter prediction control unit 210.

As above, in Embodiment 3 of the present invention, the motion vector most suitable for the current block can be selected, which allows a bit stream compressed with high efficiency to be appropriately decoded.

Furthermore, a reference motion vector of the co-located block which is to be used in temporal direct is selected according to the position of the co-located block and the number of reference motion vectors of the co-located block, which makes it possible to narrow down candidate predictive motion vectors to accurate ones and thereby possible to reduce the processing load.

Specifically, when the co-located block has two forward or backward reference motion vectors, it is likely that the motion vector of the current block and the motion vector of the co-located block are approximate in the same prediction direction. Accordingly, calculating a temporal direct vector in each of the prediction directions from the motion vector of the co-located block in the same prediction direction allows improvement in the coding efficiency. More specifically, the temporal direct vector calculation unit 211 calculates, in temporal direct, the temporal direct vector TMVL0 in the prediction direction 0 from the motion vector mvL0 of the co-located block in the prediction direction 0, and calculates, in temporal direct, the temporal direct vector TMVL1 in the prediction direction 1 from the motion vector mvL1 in the prediction direction 1.

When the co-located block has both a forward reference motion vector and a backward reference motion vector, a motion vector to be used for calculation of each of the temporal direct vector TMVL0 in the prediction direction 0 and the temporal direct vector TMVL1 in the prediction direction 1 is selected according to the position of the co-located block.

For example, when the co-located block is a backward reference block, a forward reference motion vector is used. This is because the forward reference motion vector is a motion vector directed from a picture including the co-located block toward a picture including the current block, which is likely to have a smaller prediction error than a backward reference motion vector. When the co-located block is a forward reference block, a backward reference motion vector is used. This is because the backward reference motion vector is a motion vector directed from the picture including the co-located block toward the current picture including the current block, which is likely to have a smaller prediction error than a forward reference motion vector.

Furthermore, instead of determining whether the co-located block has two forward or backward reference motion vectors, it may be possible to determine whether the reference pictures in the reference lists L0 and L1 are assigned with reference picture indices in the same way. Generally, in the reference list L1, pictures located after the current picture in display time order are assigned with reference picture indices. Meanwhile, in the reference list L0, pictures located before the current picture in display time order are assigned with reference picture indices.

Accordingly, when the reference pictures in the reference lists L1 and L0 are assigned with reference picture indices in the same way, the reference direction is limited to either one of the forward and backward directions in display order from the current picture. Thus, the determination based on the reference lists allows a reduction in the processing load. Since the reference lists are held by each picture, it is sufficient that the determination is made per picture, with the result that the determination per block is no longer necessary.

As yet another example, it may also be possible that when all the reference pictures held in the reference lists L0 and L1 of a decoded picture are located before the current picture in display order or located after the current picture in display order, the temporal direct vector TMVL0 in the prediction direction 0 is calculated in temporal direct from the motion vector mvL0 of the co-located block in the prediction direction 0, and the temporal direct vector TVML1 in the prediction direction 1 is calculated in temporal direct from the motion vector mvL1 of the co-located block in the prediction direction 1.

Although no temporal direct vector is calculated when the co-locate block has no reference motion vector in the above description, it is possible to calculate a temporal direct vector by using another block as the co-located block.

For example, when the co-located block is a backward reference block and has no reference motion vector, it is conceivable to use a forward reference block as the co-located block. In this case, the use of a backward reference motion vector out of the reference motion vectors of the forward reference block allows improvement in the prediction accuracy. When the forward reference block has no backward reference motion vector, the use of a forward reference motion vector allows a temporal direct vector to be derived.

When the co-located block is a forward reference block and has no reference motion vector, it is conceivable to use a backward reference block as the co-located block. In this case, the use of a forward reference motion vector out of the reference motion vectors of the backward reference block allows improvement in the prediction accuracy. When the backward reference block has no forward reference motion vector, the use of a backward reference motion vector allows a temporal direct vector to be derived.

For example, when the co-located block is a block within a picture assigned with an index 0 in the reference picture list L0 of the current picture and the co-located block specified by the index 0 in the reference picture list L0 has no reference motion vector, it is conceivable to use a reference motion vector of a co-located block specified by an index 0 in the reference picture list L1.

Furthermore, although this Embodiment 3 has described a method of calculating a temporal direct vector in which a motion vector derived through motion estimation is used as one of the candidate predictive motion vectors to be used at the time of decoding, the present invention is not always limited to this embodiment. For example, as a decoding mode for inter prediction of the current block in a B-picture or a P-picture in H. 264, there are a direct mode in which only a difference value of image data is decoded and a motion vector is predicted based on a peripheral block or the like, and a skip mode in which no difference value of image data and no motion vector are decoded and a predicted image at a position indicated by a motion vector predicted based on a peripheral block or the like is provided directly as a decoded image. Also in these direct mode and skip mode, a temporal direct vector calculated by the same or like method can be applied as one of the candidate predictive motion vectors.

Furthermore, as an inter prediction mode for the current block in a B-picture or a P-picture, there is a merge mode in which a motion vector and a reference picture index are copied from a neighboring block or a co-located block of the current block to decode the current block. In the merge mode, the index of the neighboring block or the like used for the copying is added to a bit stream, which allows a motion vector and a reference picture index to be selected. Also in such merge mode, a temporal direct vector calculated by the same or like method can be applied as a predictive motion vector of the co-located block.

Embodiment 4

The processing described in each of Embodiments can be simply implemented in an independent computer system, by recording, in a recording medium, a program for implementing the configuration of the moving picture coding method (the image coding method) or the moving picture decoding method (the image decoding method) described in the embodiment. The recording media may be any recording media as long as the program can be recorded, such as a magnetic disk, an optical disk, a magnetic optical disk, an IC card, and a semiconductor memory.

Hereinafter, the applications to the moving picture coding method (the image coding method) and the moving picture decoding method (the image decoding method) described in Embodiments and systems using them will be described. This system is characterized by including an image coding and decoding apparatus composed of the image coding apparatus using the image coding method and the image decoding apparatus using the image decoding method. The other structure of the system can be appropriately changed depending on situations.

Figure 15:
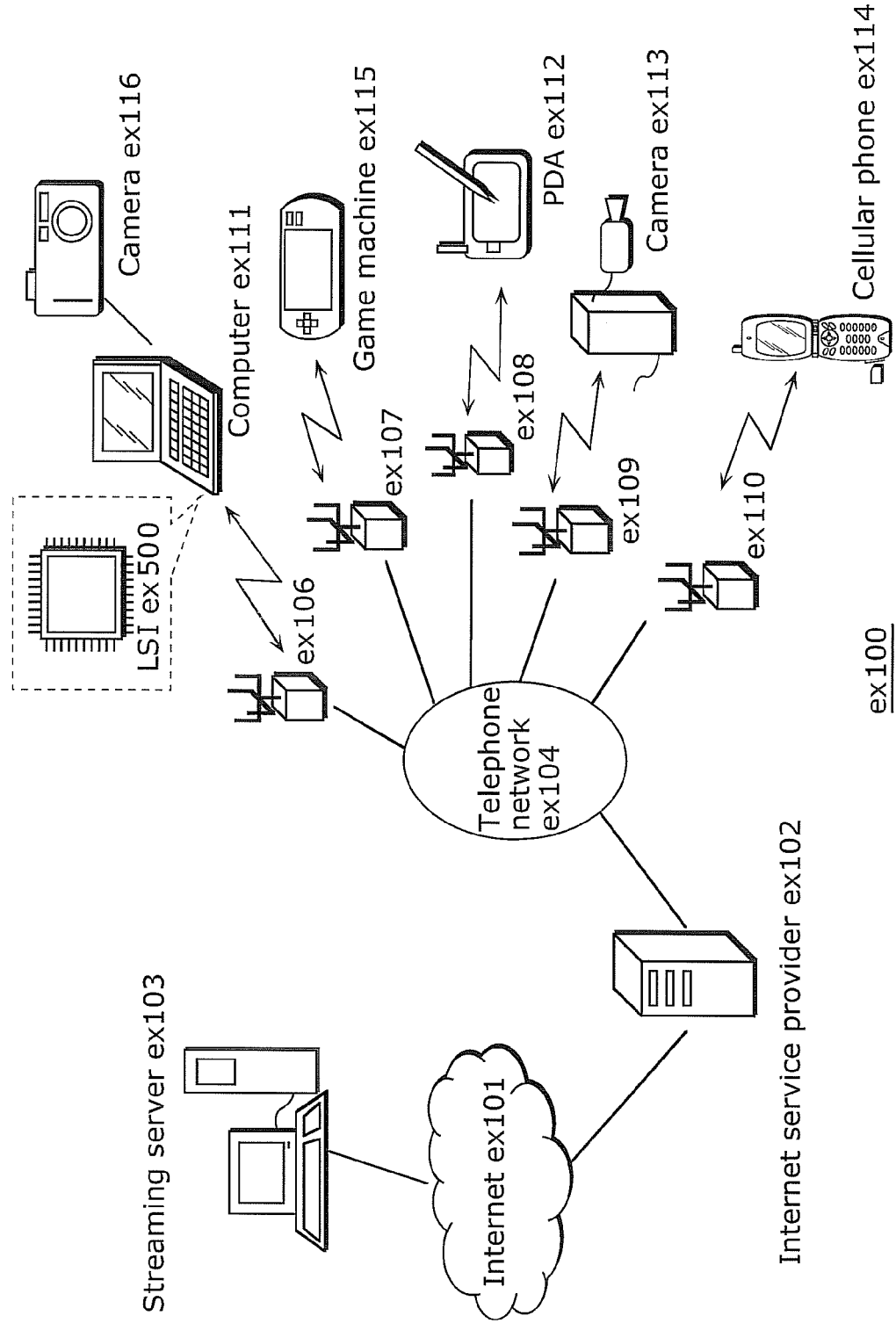
FIG. 15 illustrates an overall configuration of a content providing system for implementing content distribution services.

FIG. 15 illustrates an overall configuration of a content providing system ex100 for implementing content distribution services. The area for providing communication services is divided into cells of desired size, and base stations ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in Embodiments (that is, the system functions as the image coding apparatus according to an implementation of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the received data (that is, the system functions as the image decoding apparatus according to the implementation of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be synthesized into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
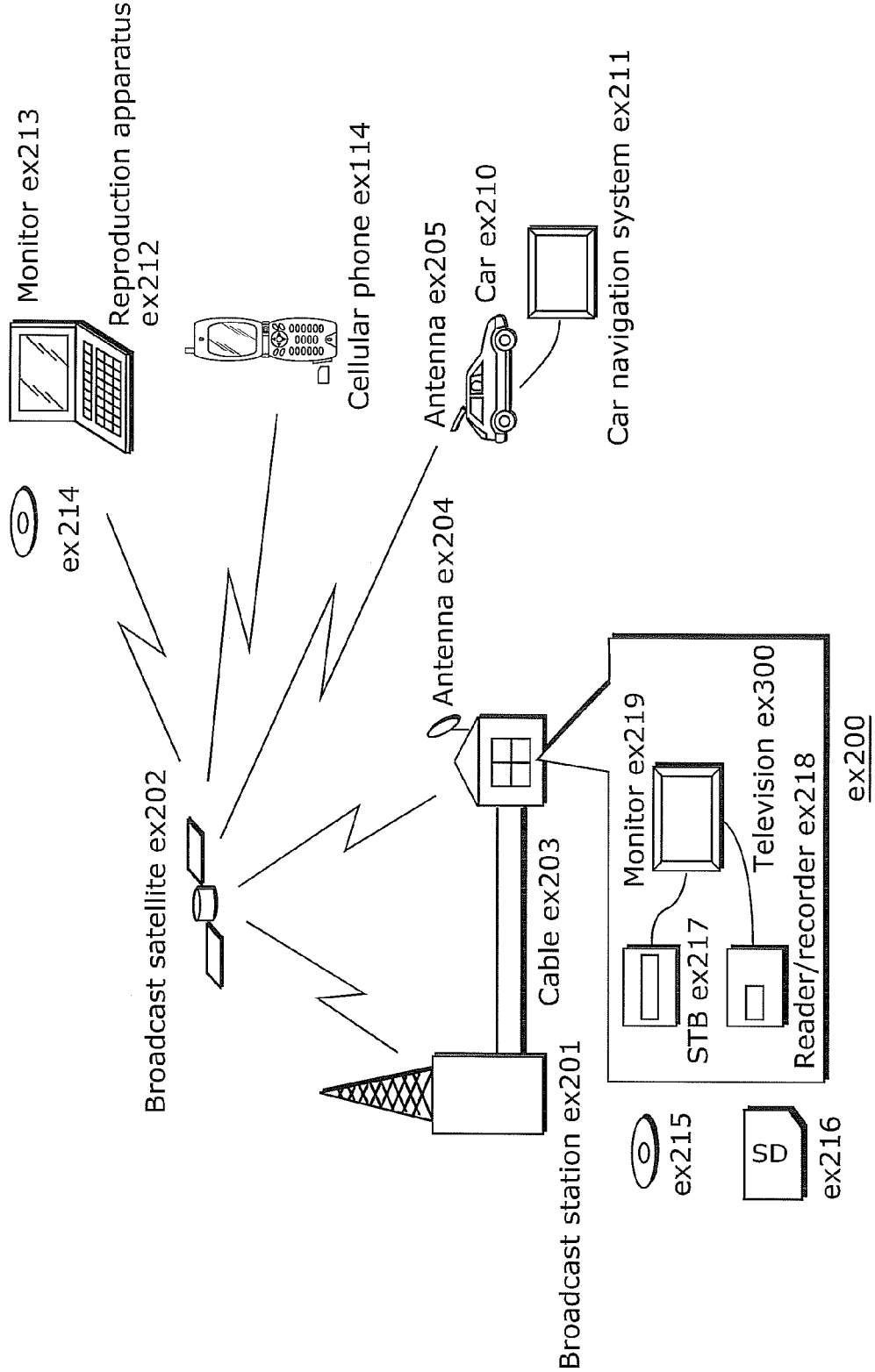
FIG. 16 illustrates an overall configuration of a digital broadcasting system.

Aside from the example of the content providing system ex100, at least one of the moving picture coding apparatus (the image coding apparatus) and the moving picture decoding apparatus (the image decoding apparatus) described in each of Embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (that is, the video data is data coded by the image coding apparatus according to an implementation of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (that is, the system functions as the image decoding apparatus according to an implementation of the present invention).

Furthermore, a reader/recorder ex218 (*i*) reads and decodes the multiplexed data recorded on a recording media ex215, such as a DVD and a BD, or (ii) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
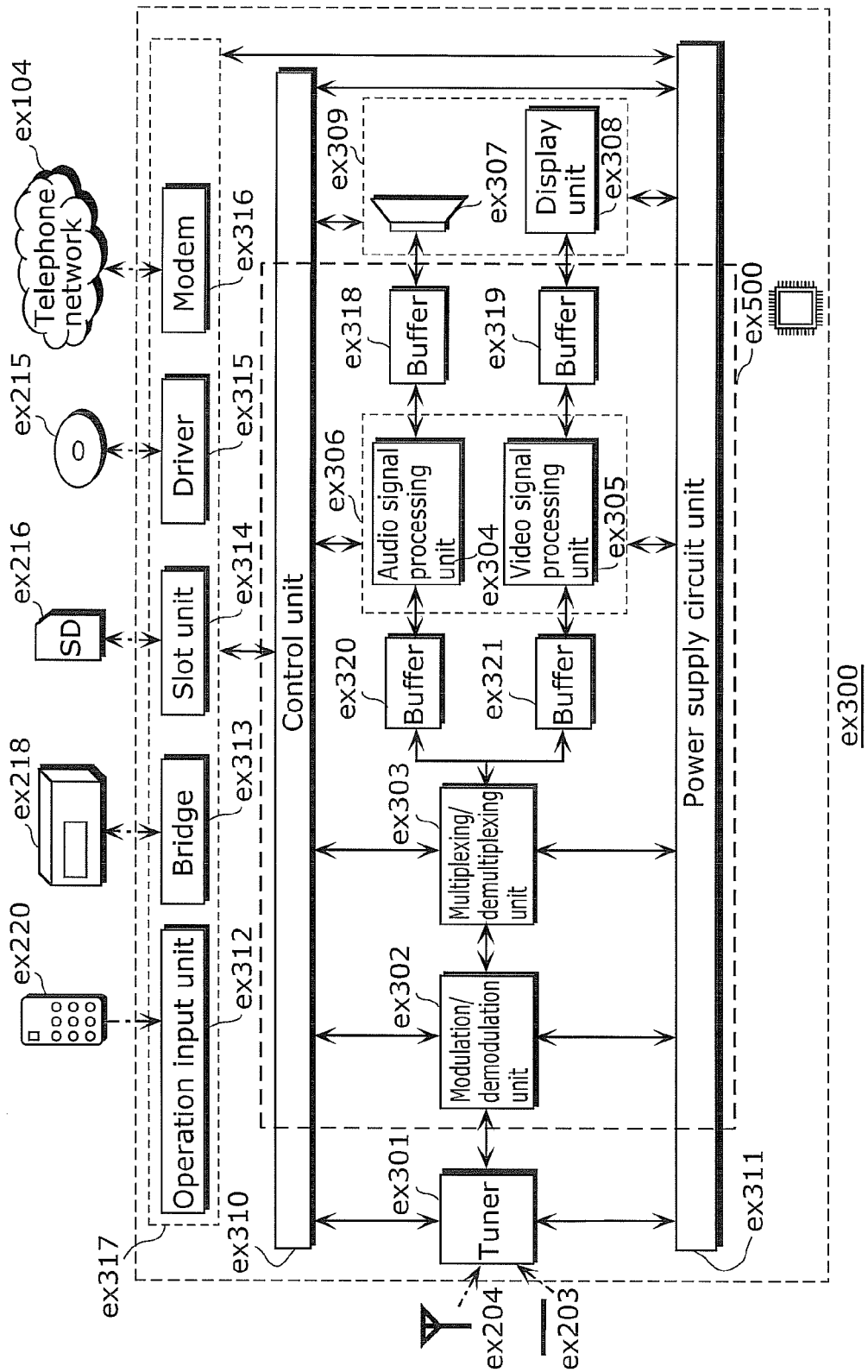
FIG. 17 is a block diagram illustrating an example of a configuration of a television.

FIG. 17 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

Furthermore, the television ex300 further includes: a signal processing unit ex306 including an audio signal processing unit ex304 and a video signal processing unit ex305 (functioning as the image coding apparatus or the image decoding apparatus according to an implementation of the present invention) that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, although not illustrate, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
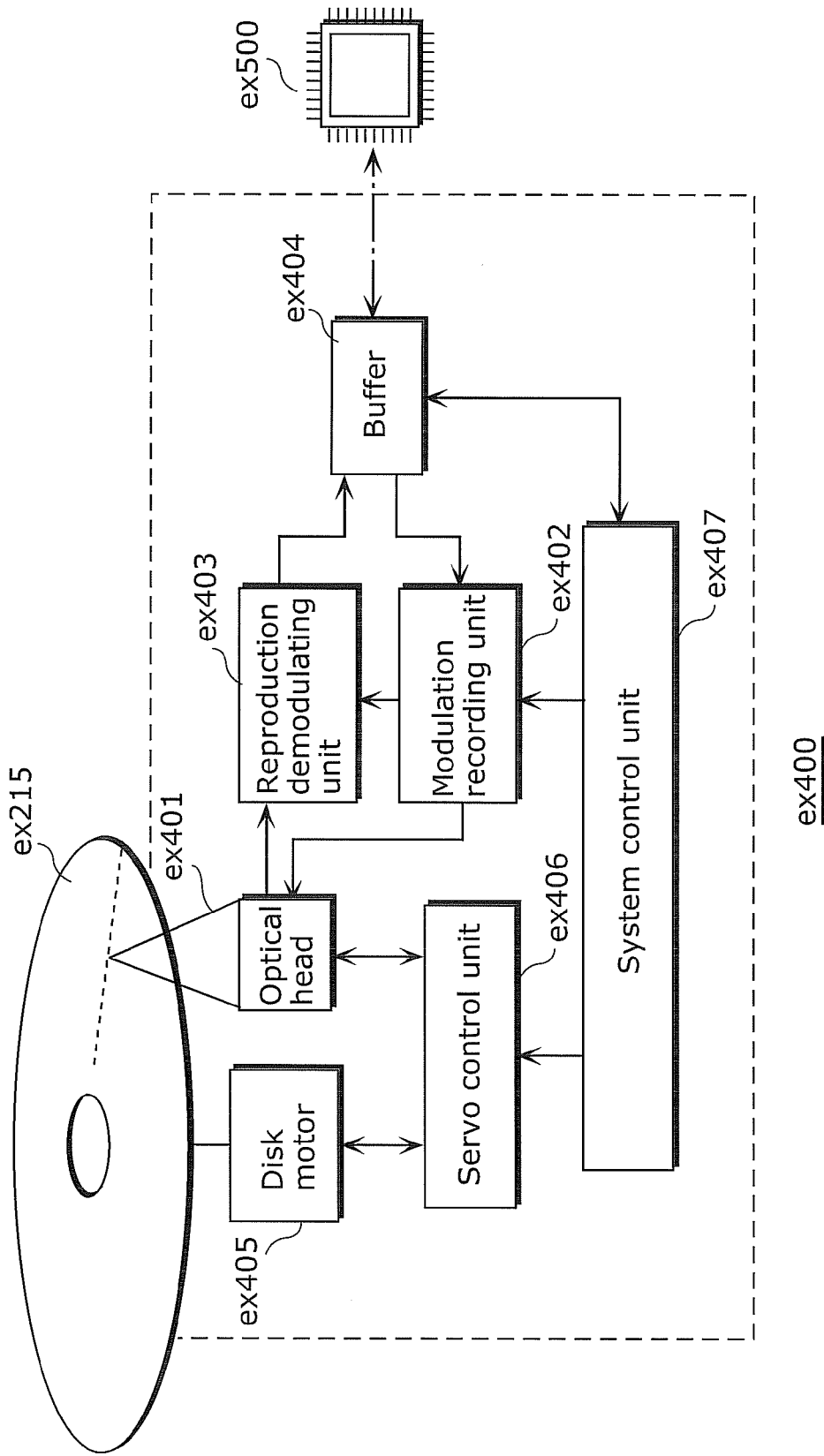
FIG. 18 is a block diagram illustrating an example of a configuration of an information reproducing/recording unit that reads and writes information from and on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
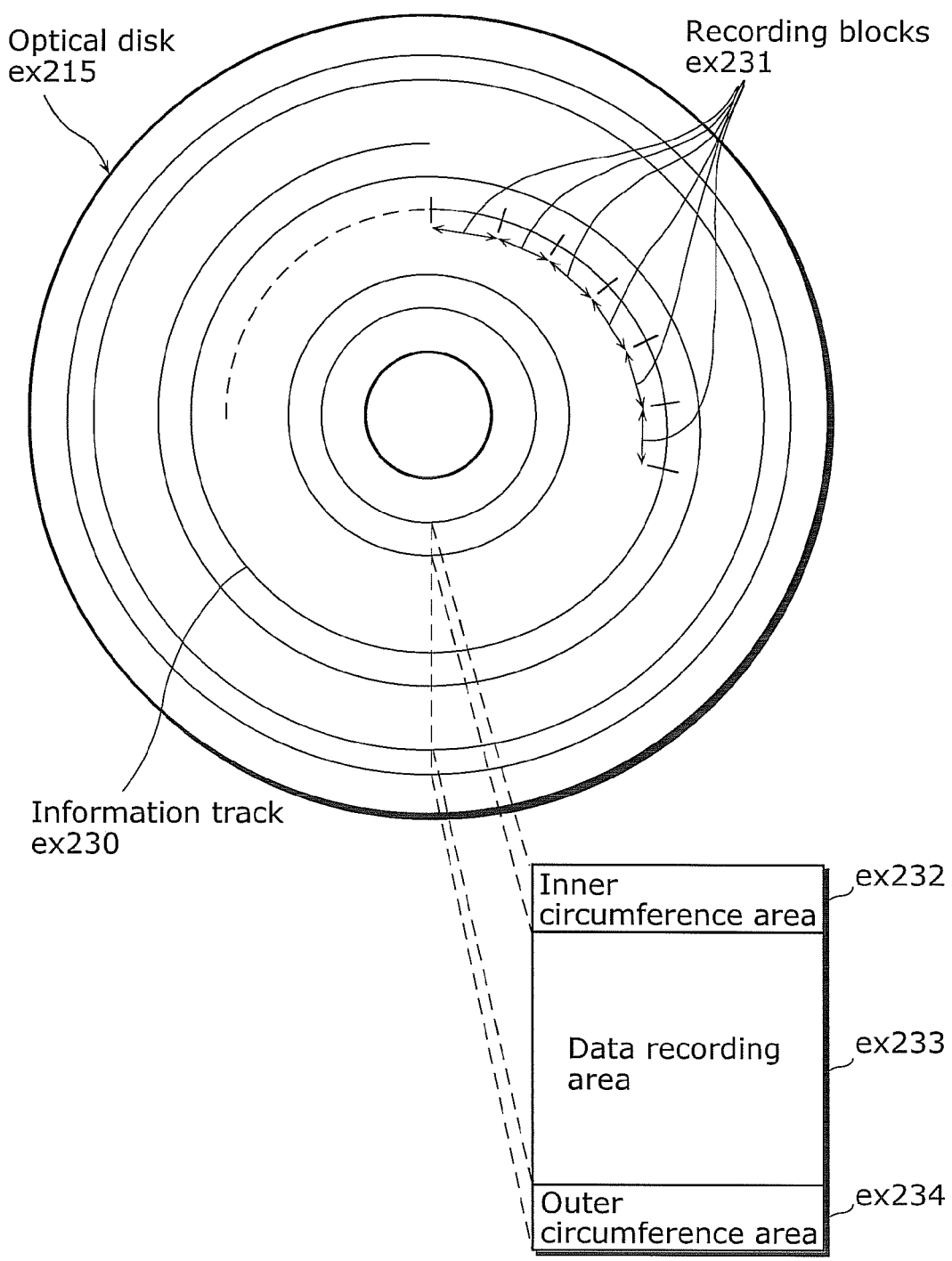
FIG. 19 shows an example of a configuration of a recording medium that is an optical disk.

FIG. 19 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
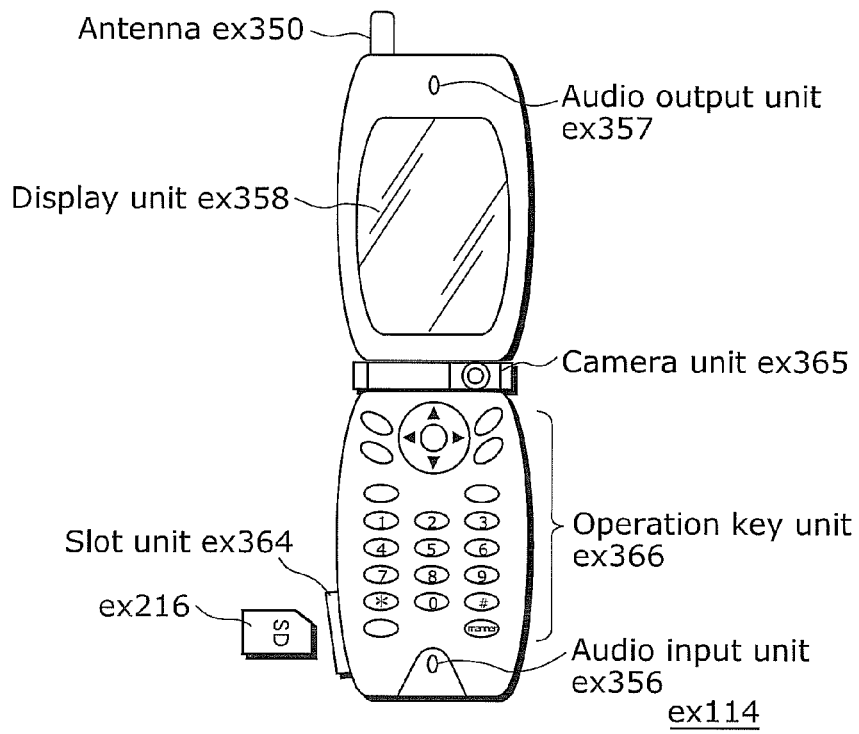
FIG. 20A shows an example of a cellular phone.

FIG. 20A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
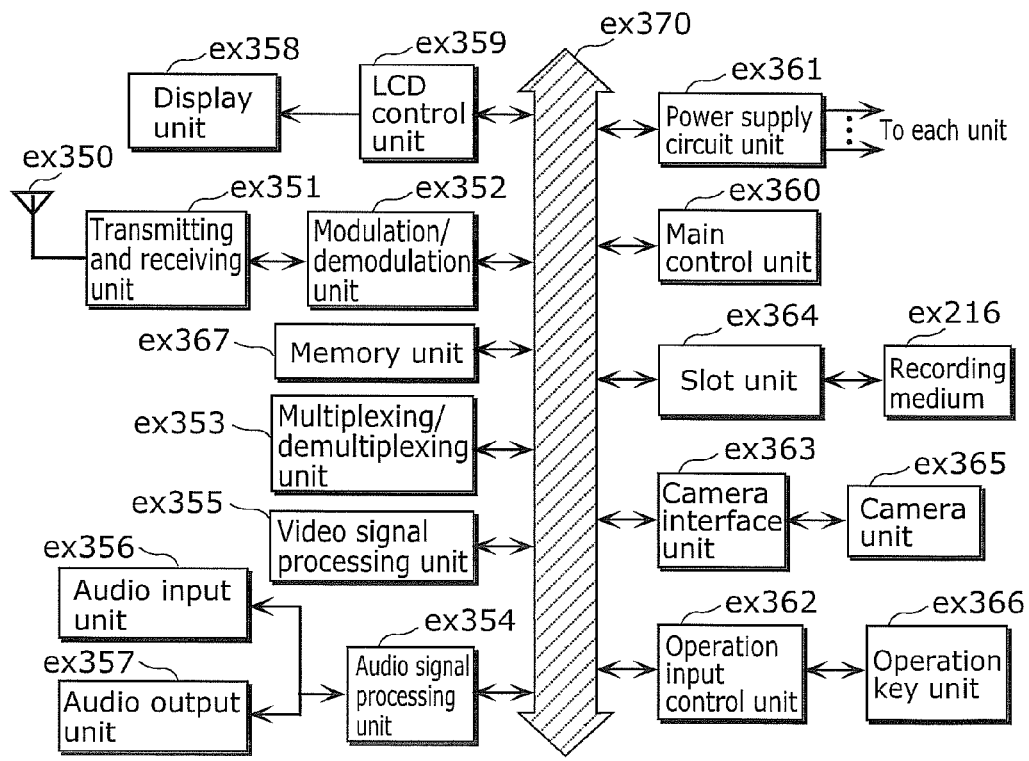
FIG. 20B is a block diagram showing an example of a configuration of the cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (that is, the video signal processing unit ex355 functions as the image coding apparatus according to an implementation of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation circuit unit (the modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (that is, the video signal processing unit ex355 functions as the image decoding apparatus according to an implementation of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably has 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 5

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 22:
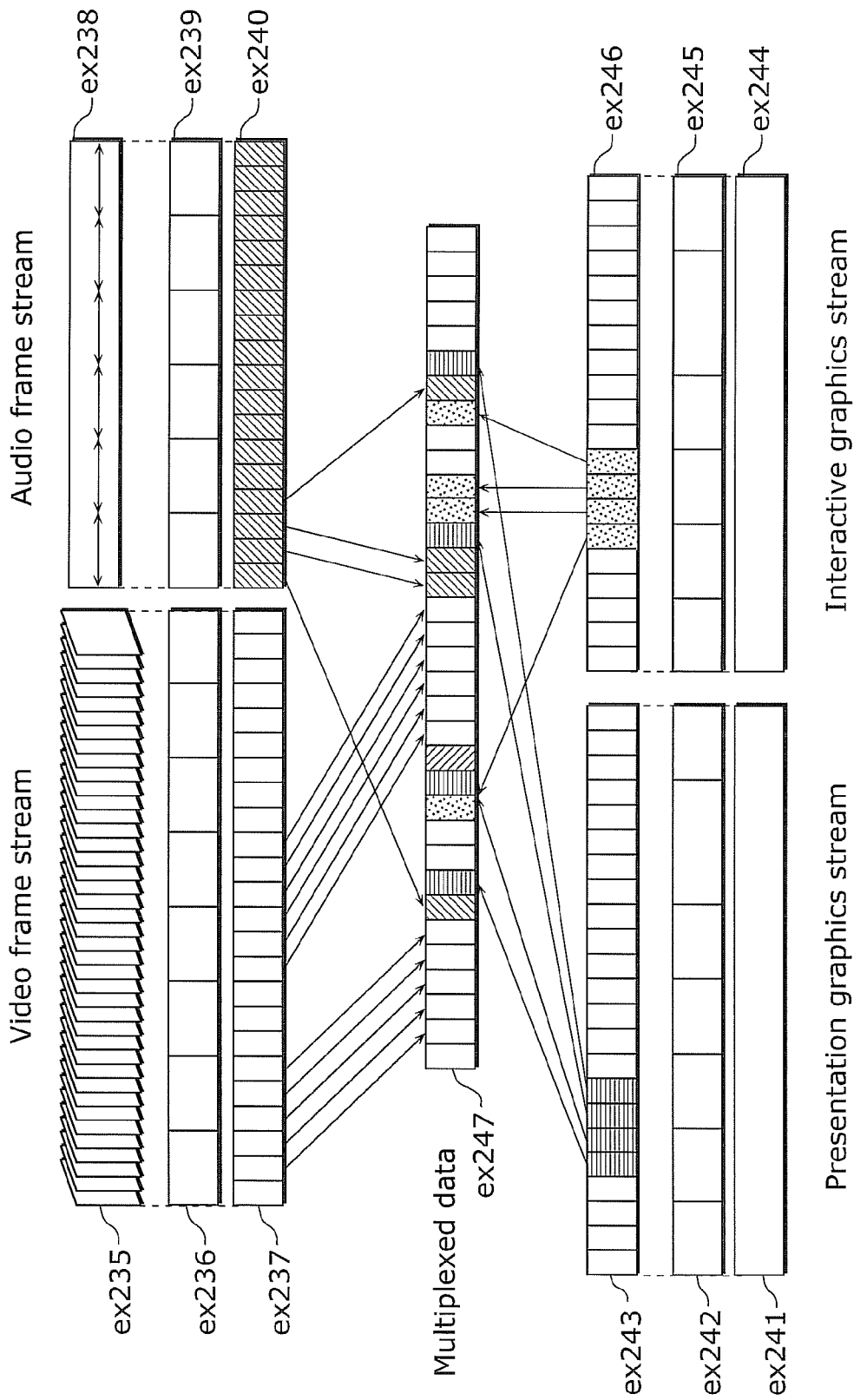
FIG. 22 schematically illustrates how each of streams is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
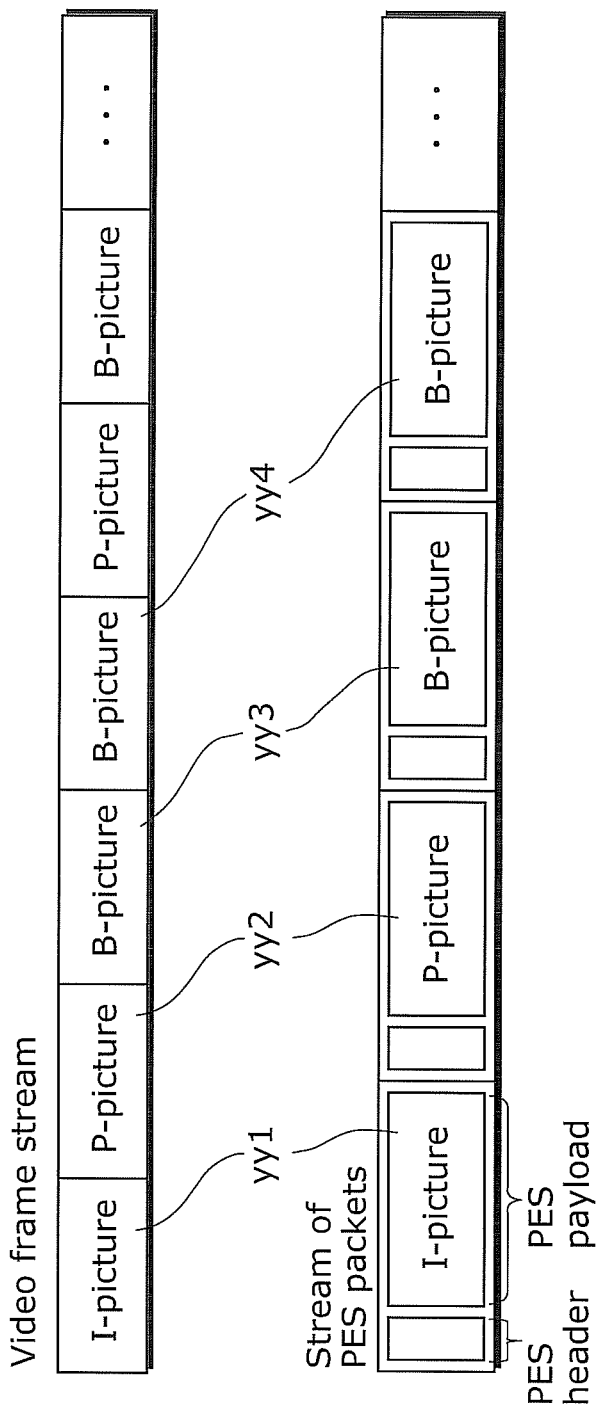
FIG. 23 illustrates how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 24:
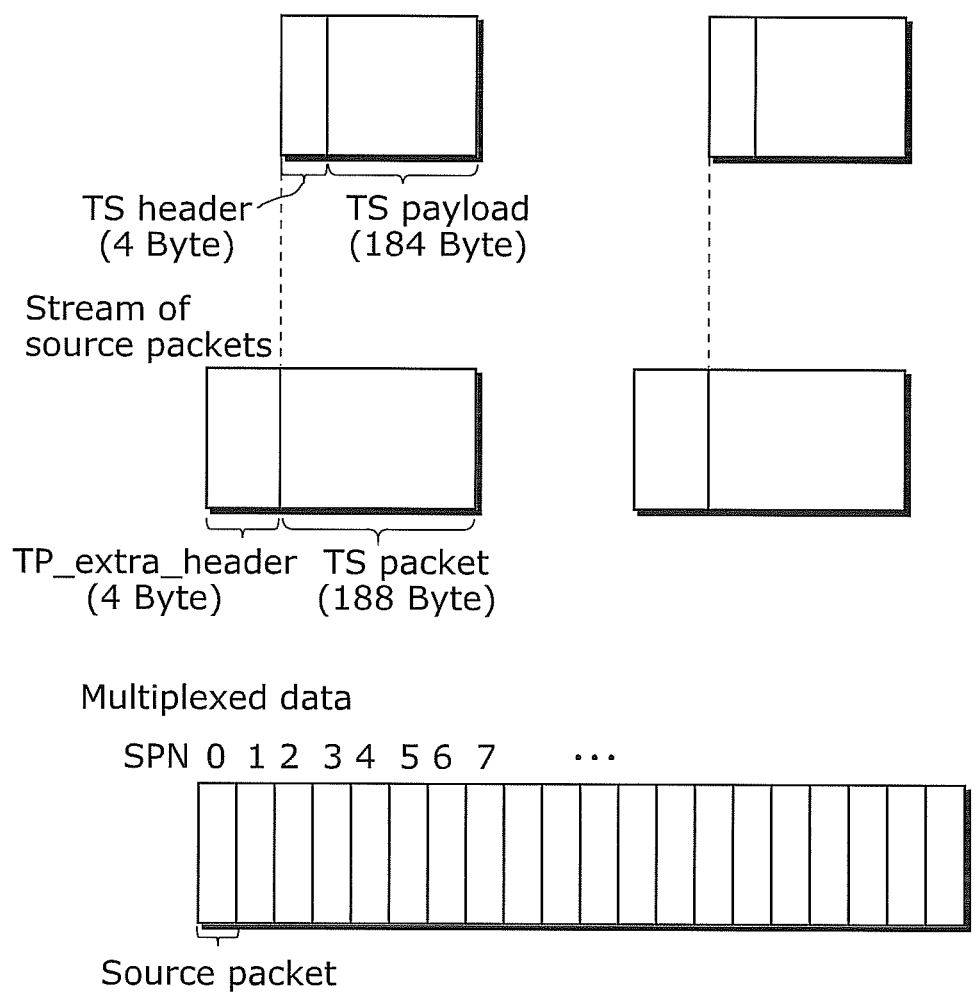
FIG. 24 shows a structure of TS packets and source packets in the multiplexed data.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information on the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
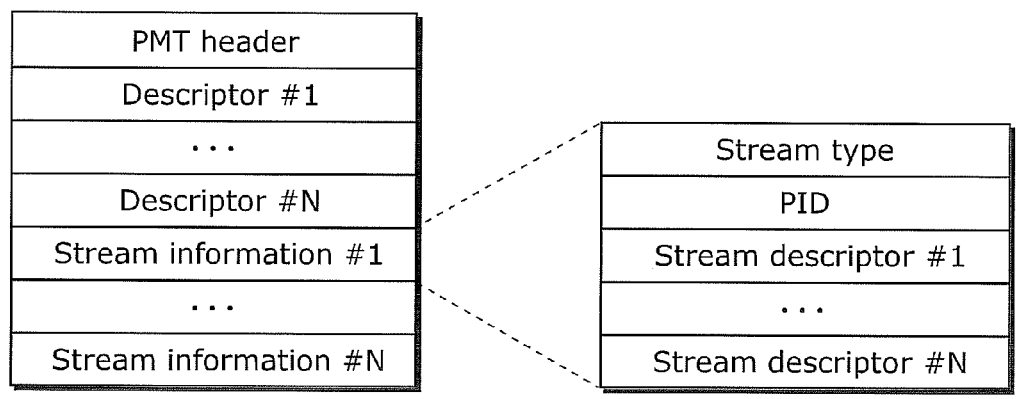
FIG. 25 shows a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
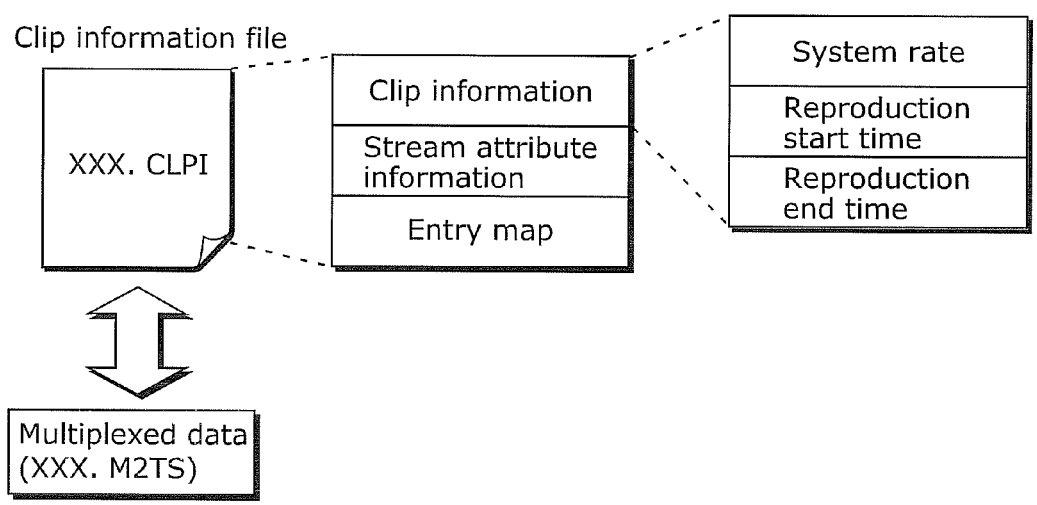
FIG. 26 illustrates an internal structure of multiplexed data information.

Each of the multiplexed data information files is management information on the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
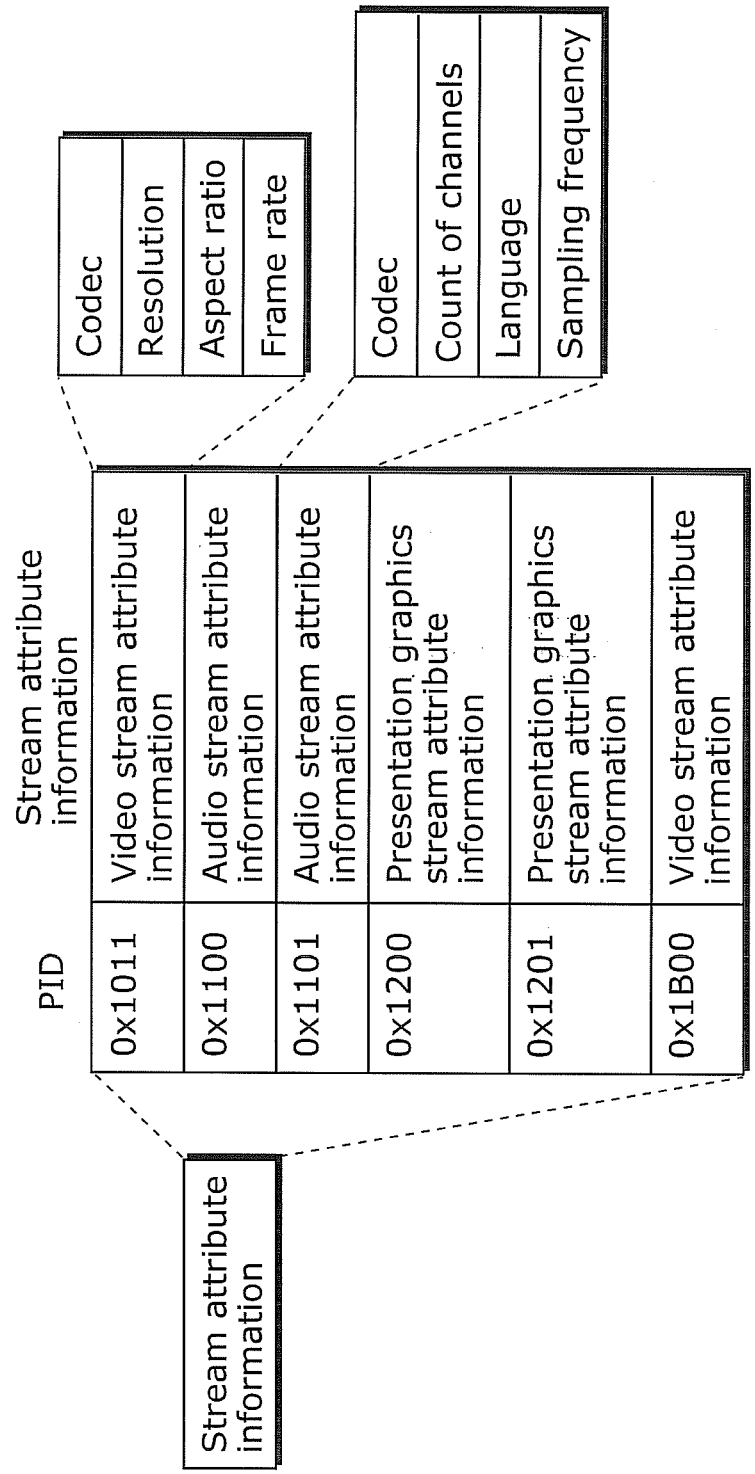
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In this embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 28:
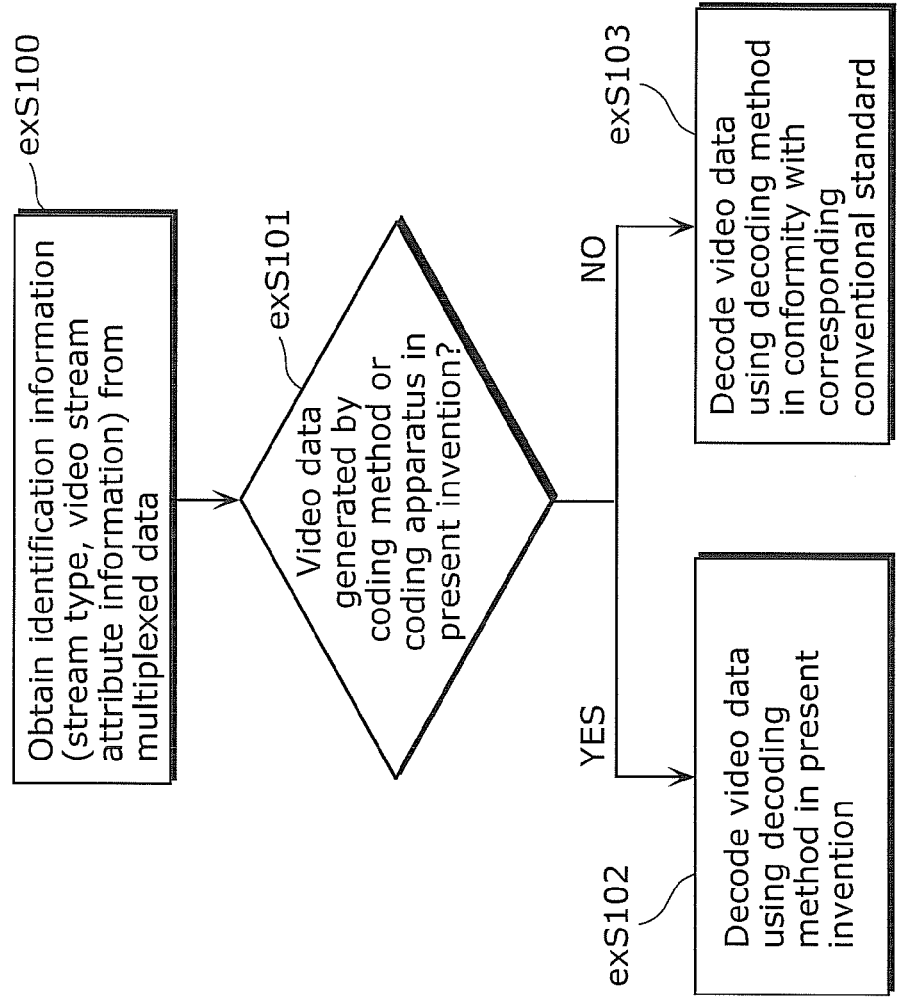
FIG. 28 shows steps for identifying video data.

Furthermore, FIG. 28 illustrates steps of the moving picture decoding method according to this embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in this embodiment can be used in the devices and systems described above.

Embodiment 6

Figure 29:
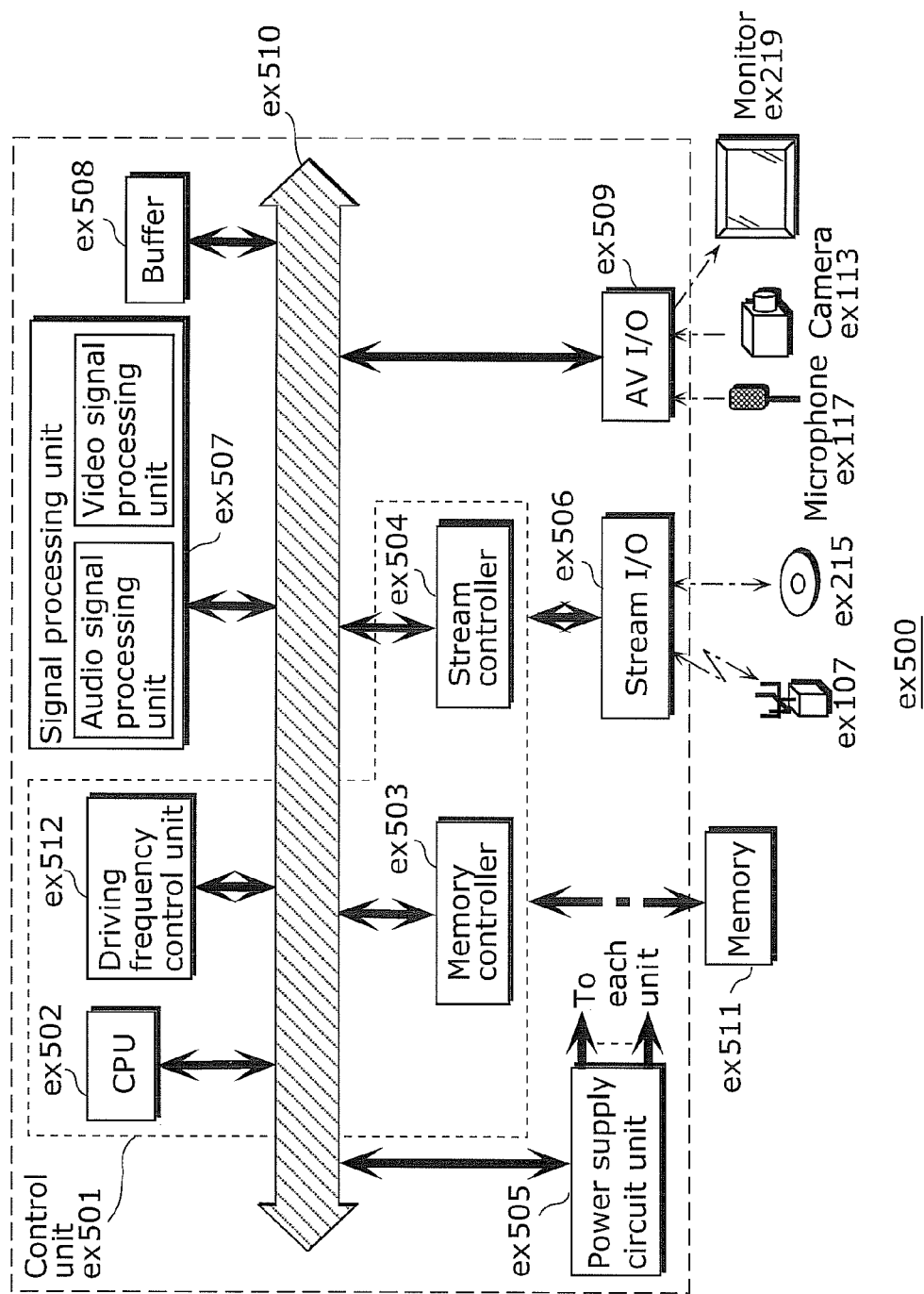
FIG. 29 is a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example, FIG. 29 illustrates a configuration of an LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, and the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
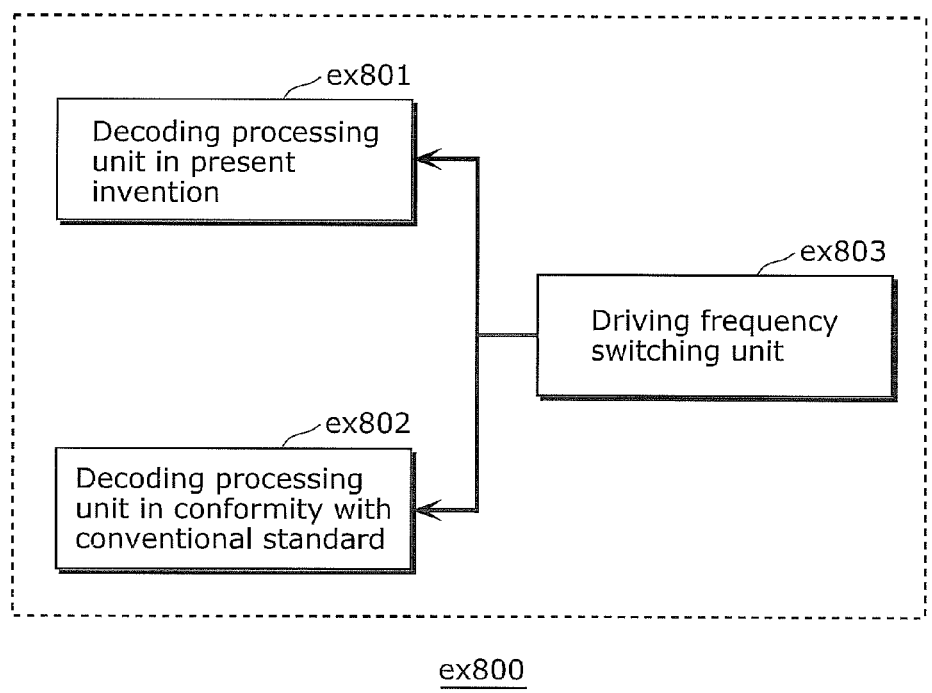
FIG. 30 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in this embodiment. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex802 includes the CPU ex502 and the driving frequency control unit ex512 in FIG. 29. Here, each of the decoding processing unit ex801 that executes the moving picture decoding method described in each of Embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 or in an internal memory of an LSI, and referring to the look-up table by the CPU ex502.

Figure 31:
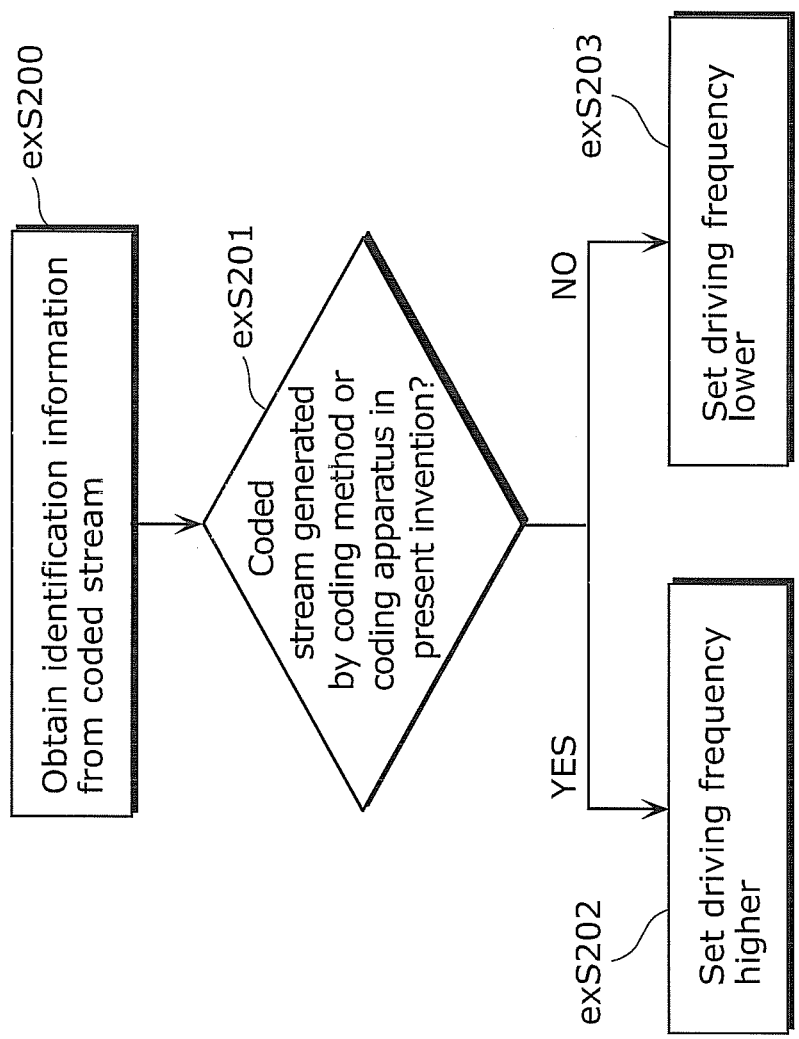
FIG. 31 shows steps for identifying video data and switching between driving frequencies.

FIG. 31 illustrates steps for executing a method in this embodiment. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 33A:
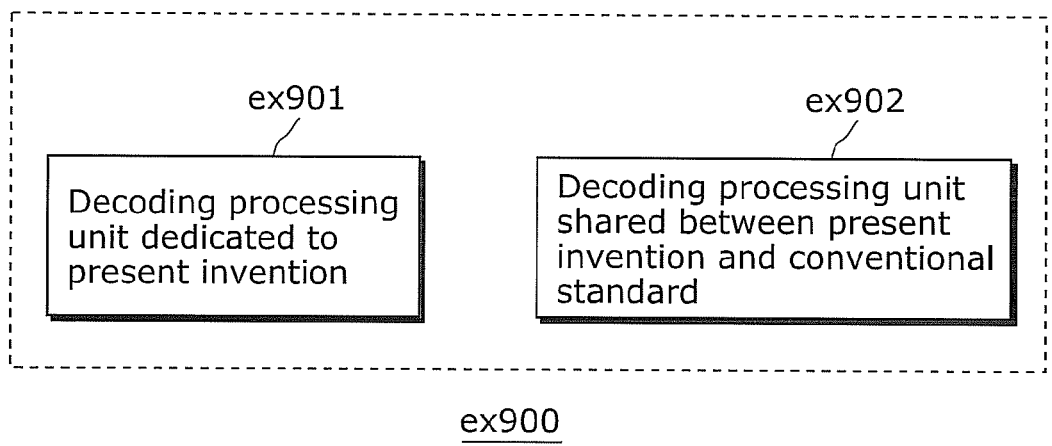
FIG. 33A shows an example of a configuration for sharing a module of a signal processing unit.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. An example of the configuration is shown as ex900 in FIG. 33A. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing that does not conform to MPEG4-AVC and is unique to the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of Embodiments may be shared for the processing to be shared, and a dedicated decoding processing unit may be used for processing unique to that of MPEG4-AVC.

Figure 33B:
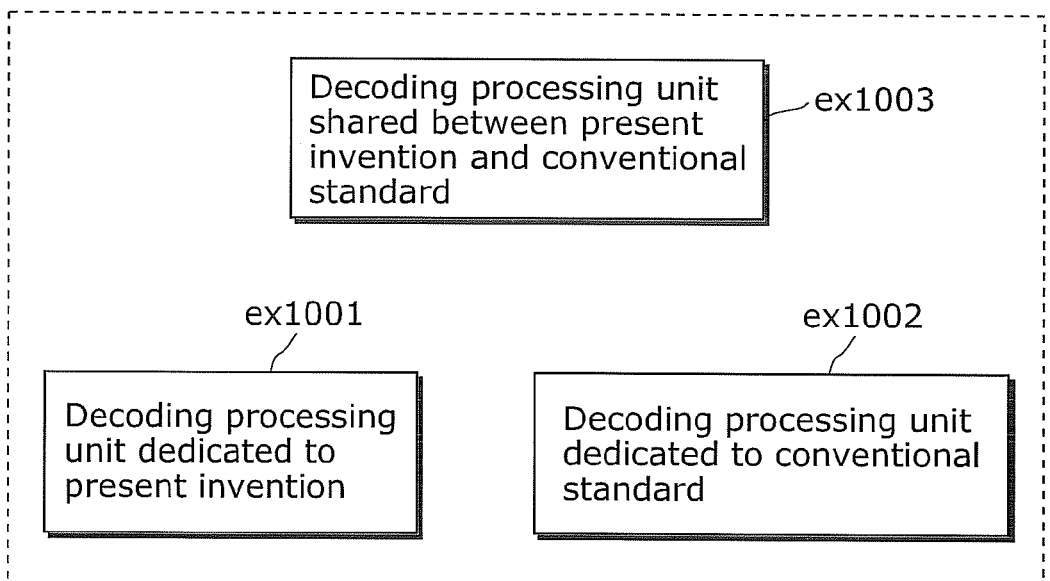
FIG. 33B is a diagram showing another example of a configuration for sharing a module of a signal processing unit.

Furthermore, ex1000 in of FIG. 33B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is advantageously used for a moving picture coding apparatus and a moving picture decoding apparatus.

The invention claimed is:

1. A moving picture decoding method of decoding a current block which is included in a current picture by performing temporal prediction using a co-located block which is included in a decoded picture, the co-located block having two reference motion vectors, the two reference motion vectors being two motion vectors calculated with reference to one or more pictures located before the current picture in display order, said moving picture decoding method comprising:
  generating a first predictive motion vector and a second predictive motion vector;
  decoding a first motion vector and a second motion vector, respectively, using the first predictive motion vector and the second predictive motion vector, and
  decoding the current block using the first motion vector and the second motion vector, respectively, with reference to a first reference picture list and a second reference picture list; wherein
  (i) when any reference pictures in the first reference picture list and the second reference picture list are located before the current picture in display order,
    the first predictive motion vector is generated using a first reference motion vector out of the two reference motion vectors, the first predictive motion vector and the first reference motion vector each corresponding to the first reference picture list, and
    the second predictive motion vector is generated using a second reference motion vector out of the two reference motion vectors, the second predictive motion vector and the second reference motion vector each corresponding to the second reference picture list, the second reference motion vector being different than the first reference motion vector, and
  (ii) when a reference picture in the first reference picture list and the second reference picture list are not located before the current picture in display order, and the first reference motion vector and the second reference motion vector refer to different directions,
    both of the first predictive motion vector and the second predictive motion vector are generated using only one of the first reference motion vector and the second reference motion vector.

2. A moving picture decoding apparatus which decodes a current block which is included in a current picture by performing temporal prediction using a co-located block which is included in a decoded picture, the co-located block having two reference motion vectors, the two reference motion vectors being two motion vectors calculated with reference to one or more pictures located before the current picture in display order, said moving picture decoding apparatus comprising:
  at least one processor; and
  storage coupled to the at least one processor;
  wherein the at least one processor:
  generates a first predictive motion vector and a second predictive motion vector;
  decodes a first motion vector and a second motion vector, respectively, using the first predictive motion vector and the second predictive motion vector, and
  decodes the current block using the first motion vector and the second motion vector, respectively, with reference to a first reference picture list and a second reference picture list; wherein
  (i) when any reference pictures in the first reference picture list and the second reference picture list are located before the current picture in display order, the any reference pictures being in the storage,
    the first predictive motion vector is generated using a first reference motion vector out of the two reference motion vectors, the first predictive motion vector and the first reference motion vector each corresponding to the first reference picture list, and
    the second predictive motion vector is generated using a second reference motion vector out of the two reference motion vectors, the second predictive motion vector and the second reference motion vector each corresponding to the second reference picture list, the second reference motion vector being different than the first reference motion vector, and
  (ii) when a reference picture in the first reference picture list and the second reference picture list are not located before the current picture in display order, and the first reference motion vector and the second reference motion vector refer to different directions,
    both of the first predictive motion vector and the second predictive motion vector are generated using only one of the first reference motion vector and the second reference motion vector.

* * * * *